(12) United States Patent
Siomina

(10) Patent No.: US 11,799,694 B2
(45) Date of Patent: *Oct. 24, 2023

(54) SYSTEMS AND METHODS FOR CONFIGURING A RADIO LINK MONITORING EVALUATION PERIOD

(71) Applicant: TELEFONAKTIEBOLAGET LM ERICSSON (PUBL), Stockholm (SE)

(72) Inventor: Iana Siomina, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/077,903

(22) Filed: Dec. 8, 2022

(65) Prior Publication Data
US 2023/0106975 A1   Apr. 6, 2023

Related U.S. Application Data

(63) Continuation of application No. 16/759,962, filed as application No. PCT/IB2018/059050 on Nov. 16, 2018, now Pat. No. 11,575,542.
(Continued)

(51) Int. Cl.
| | |
|---|---|
| *H04W 72/04* | (2023.01) |
| *H04L 25/02* | (2006.01) |
| *H04B 17/309* | (2015.01) |
| *H04W 76/25* | (2018.01) |
| *H04W 76/28* | (2018.01) |
| *H04L 5/00* | (2006.01) |

(Continued)

(52) U.S. Cl.
CPC ....... *H04L 25/0224* (2013.01); *H04B 17/309* (2015.01); *H04L 5/005* (2013.01); *H04W 24/10* (2013.01); *H04W 56/0035* (2013.01); *H04W 76/25* (2018.02); *H04W 76/28* (2018.02)

(58) Field of Classification Search
CPC ... H04L 25/0224; H04L 5/005; H04B 17/309; H04W 76/25; H04W 76/28; H04W 24/10; H04W 56/0035; H04W 56/00
See application file for complete search history.

(56) References Cited

U.S. PATENT DOCUMENTS

| | | |
|---|---|---|
| 9,585,045 B2 | 2/2017 | Lee et al. |
| 2012/0108177 A1 | 5/2012 | Miao et al. |

(Continued)

FOREIGN PATENT DOCUMENTS

| | | |
|---|---|---|
| CN | 103202050 A | 9/2016 |
| JP | 2012523766 A | 10/2012 |

(Continued)

OTHER PUBLICATIONS

ZTE, R1-1707052 NPL—Radio Link Monitoring in NR, May 15-19, 2017 (Year: 2017).*

(Continued)

*Primary Examiner* — Mahbubul Bar Chowdhury

(57) ABSTRACT

A wireless device or network node determines an evaluation period that is common to at least a portion of reference signal resources in a set of reference signal resources that are transmitted by the network node, with at least one of the reference signal resources in the set being of a different type or configuration than another of the reference signal resources in the set.

29 Claims, 23 Drawing Sheets

Related U.S. Application Data

(60) Provisional application No. 62/588,182, filed on Nov. 17, 2017.

(51) Int. Cl.
*H04W 24/10* (2009.01)
*H04W 56/00* (2009.01)

(56) References Cited

U.S. PATENT DOCUMENTS

| | | |
|---|---|---|
| 2014/0286176 A1 | 9/2014 | Ro et al. |
| 2017/0230780 A1 | 8/2017 | Chincholi et al. |
| 2017/0251499 A1 | 8/2017 | Radulescu et al. |
| 2019/0052380 A1 | 2/2019 | Cui et al. |
| 2019/0081675 A1 | 3/2019 | Jung et al. |
| 2019/0081753 A1* | 3/2019 | Jung ............... H04B 7/088 |
| 2019/0124532 A1 | 4/2019 | Almalfouh et al. |
| 2020/0236566 A1 | 7/2020 | Kou et al. |

FOREIGN PATENT DOCUMENTS

| | | |
|---|---|---|
| JP | 2014531868 A | 11/2014 |
| RU | 2016113845 A | 10/2017 |

OTHER PUBLICATIONS

LG Electronics, "Discussion on Radio Link Monitoring in NR", 3GPP TSG RAN WG1 Meeting #89, R1-1707597, May 15-19, 2017, Hangzhou, China.

Qualcomm Incorporated, "Radio link monitoring consideration", 3GPP TSG-RAN WG1 NR#2, R1-1711151, Jun. 27-30, 2017, Qingdao, P.R. China.

Samsung, "Radio link monitoring evaluation period for DRX for eICIC", 3GPP TSG RAN WG4 #59, R4-113107, May 9-13, 2011, Barcelona, Spain.

3GPP TS 38.133, V0.3.0, "3rd Generation Partnership Project; Technical Specification Group Radio Access Network; New Radio(NR); Requirements for support of radio resource management (Release 15)", Nov. 2017.

Ericsson, "Further considerations on RLM for NR", 3GPP TSG-RAN WG4 Meeting NR ad-hoc #3, Nagoya, Japan, Sep. 18-21, 2017, pp. 1-6, R4-1709782, 3GPP.

Samsung, "RLM source in HF NR", 3GPP TSG-RAN WG2 Meeting #98, Hangzhou, China, May 15-19, 2017, pp. 1-2, R2 1704695, 3GPP.

ZTE, "Radio Link Monitoring in NR", 3GPP TSG RAN WG1 #89 Meeting, Hangzhou, P.R. of China, May 15-19, 2017, pp. 1-6, R1-1707052, 3GPP.

* cited by examiner

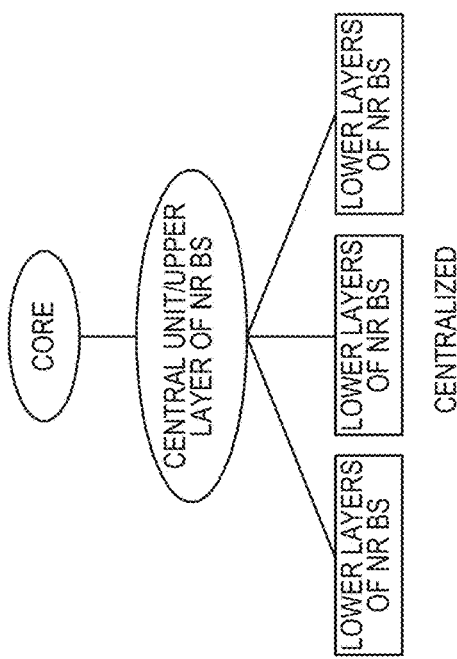
FIG. 2C
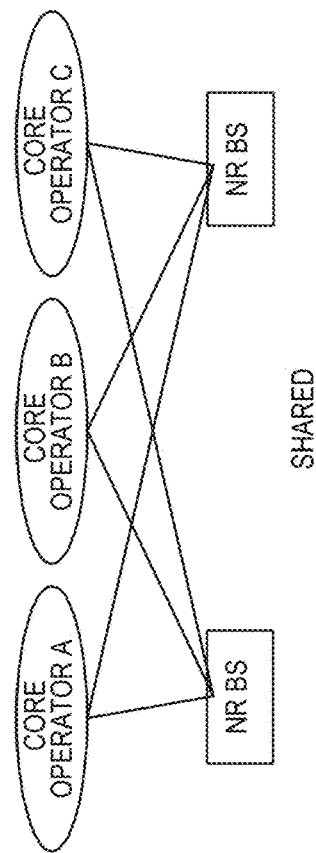
FIG. 2B
FIG. 2D
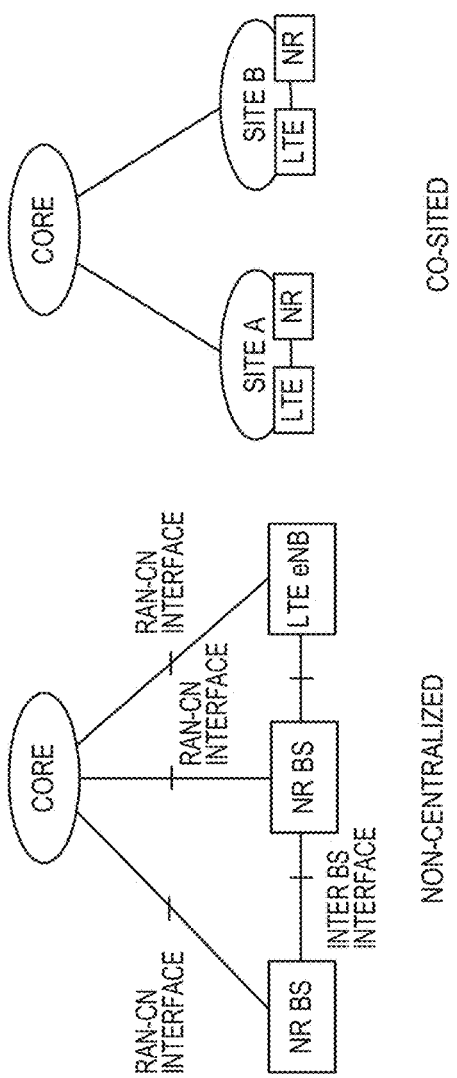
FIG. 2A

SYSTEMS AND METHODS FOR CONFIGURING A RADIO LINK MONITORING EVALUATION PERIOD

RELATED APPLICATIONS

This application is continuation of U.S. application Ser. No. 16/759,962, filed Apr. 28, 2020, which is a 371 of International Application No. PCT/IB2018/059050, filed Nov. 16, 2018, which claims the benefit of U.S. Provisional Patent Application No. 62/588,182, filed Nov. 17, 2017, the disclosures of which are fully incorporated herein by reference.

TECHNICAL FIELD

The present disclosure generally relates to radio link monitoring (RLM) in a wireless communication system, and more particularly relates to configuring an RLM evalution period that enables a wireless device to monitor channel quality.

BACKGROUND

The purpose of radio link monitoring (RLM) is typically to monitor the radio link quality of a serving cell of a wireless device (e.g., User Equipment (UE)) and use that information to decide whether the wireless device is in-sync or out-of-sync with regard to that serving cell. Long Term Evolution (LTE) supports RLM. However, New Radio (NR) (also known as 5th Generation (5G) or Next Generation (NG)) architecture is being discussed in the 3rd Generation Partnership Project (3GPP). The manner in which RLM has historically been performed, e.g., in LTE, is not necessarily suitable or efficient for use in future iterations of LTE or in subsequent architectures, such as NR.

SUMMARY

According to embodiments of the present disclosure, a wireless device or network node determines an evaluation period that is common to at least a portion of reference signal resources in a set of reference signal resources that are transmitted by the network node, with at least one of the reference signal resources in the set being of a different type or configuration than another of the reference signal resources in the set. In some embodiments, determination of such an evaluation period in this way may, e.g., be suitable for enabling configuration of an RLM evaluation period in a variety of radio environments and/or provide other benefits.

More particularly, embodiments of the present disclosure include a method performed by a wireless device for configuring a radio link monitoring evaluation period. The method comprises determining an evaluation period that is common to at least a portion of reference signal resources in a set of reference signal resources that are transmitted by a network node, with at least one of the reference signal resources in the set being of a different type or configuration than another of the reference signal resources in the set. The method further comprises monitoring channel quality of the portion of reference signal resources in the set that are received during the determined evaluation period.

In some embodiments, the method further comprises determining which of a plurality of resources configured by the network node as reference signal resources for monitoring of the channel quality are comprised in the set of reference signal resources that are transmitted by the network node. In some such embodiments, determining which of the plurality of resources configured by the network node as reference signal resources for monitoring of the channel quality are comprised in the set of reference signal resources that are transmitted by the network node is based on an indication from the network node indicating which of the plurality of resources configured as reference signal resources for monitoring of the channel quality are transmitted.

In some embodiments, the method further comprises determining the portion of reference signal resources in the set that correspond to the evaluation period.

In some embodiments, the portion of reference signal resources in the set includes at least two reference signal resources.

In some embodiments, at least one of the reference signal resources in the portion of reference signal resources in the set that are received during the determined evaluation period is of a different type or configuration than another of the reference signal resources in that portion.

In some embodiments, the method further comprises determining whether the wireless device is in-sync or out-of-sync with the network node based on the channel quality of the portion of reference signal resources in the set that are received during the evaluation period. In some embodiments, said determining whether the wireless device is in-sync or out-of-sync is responsive to said monitoring the evaluation period. In some embodiments, said determining whether the wireless device is in-sync or out-of-sync is additionally or alternatively performed at a certain interval. In some such embodiments, a length of the certain interval is no more than a length of the evaluation period.

In some embodiments, a length of the evaluation period is equivalent to a length of the portion of reference signal resources in the set that correspond to the evaluation period.

In some embodiments, a start of the evaluation period is equivalent to a start of the set that is transmitted by the network node.

In some embodiments, a start of the evaluation period is after a start of the set that is transmitted by the network node but before a finish of that set.

In some embodiments, the evaluation period corresponds to a period for determining whether the wireless device is in-sync with the network node.

In some embodiments, the evaluation period corresponds to a period for determining whether the wireless device is out-of-sync with the network node.

In some embodiments, a length of a period for determining whether the wireless device is in-sync with the network node is different from a length of a period for determining whether the wireless device is out-of-sync with the network node.

In some embodiments, a length of the evaluation period is predetermined.

In some embodiments, a length of the evaluation period is based on a function. In some such embodiments, the function is based on at least one of the following parameters: periodicity; bandwidth; density; frequency range in which the set is configured; number of samples of the set that comprise reference signals; shortest possible evaluation period; discontinuous receive (DRX) configuration; gap configuration; SMTC period.

In some embodiments, the method further comprises receiving, by the wireless device, from the network node, the evaluation period.

In some embodiments, said determining the evaluation period is responsive to said receiving.

In some embodiments, the method further comprises receiving, by the wireless device, from the network node, an indication of whether to use or not use the evaluation period. In some such embodiments, said determining the evaluation period is responsive to determining that the indication indicates using the evaluation period. Additionally or alternatively, the method may comprise receiving, by the wireless device, from the network node, a value of a parameter used to determine the evaluation period, and said determining the evaluation period is based on the parameter. In some such embodiments, the parameter is at least one of the following: periodicity; bandwidth; density; frequency range in which the set is configured; number of samples of the set that comprise reference signals; shortest possible evaluation period; discontinuous receive (DRX) configuration; gap configuration; and SMTC period. Additionally or alternatively, according to embodiments, the parameter corresponds to a function for determining the evaluation period.

In some embodiments, the method further comprises obtaining a value of a parameter for a function that is used to determine the evaluation period.

Other embodiments of the present disclosure include a method performed by a network node for configuring a radio link monitoring evaluation period for a wireless device. The method comprises determining an evaluation period that is common to at least a portion of reference signal resources in a set of reference signal resources that are transmitted by the network node, with at least one of the reference signal resources in the set being of a different type or configuration than another of the reference signal resources in the set. The method further comprises configuring the determined evaluation period so that a wireless device is operable to monitor channel quality of the portion of reference signal resources in the set that are transmitted during the determined evaluation period.

In some embodiments, the method further comprises sending an indication to the wireless device to indicate which of a plurality of resources configured as reference signal resources for monitoring of the channel quality are transmitted.

In some embodiments, the method further comprises determining the portion of reference signal resources in the set that correspond to the evaluation period.

In some embodiments, the portion of reference signal resources in the set includes at least two reference signal resources.

In some embodiments, at least one of the reference signal resources in the portion of reference signal resources in the set that are transmitted during the determined evaluation period is of a different type or configuration than another of the reference signal resources in that portion.

In some embodiments, a length of the evaluation period is equivalent to a length of the portion of reference signal resources in the set that correspond to the evaluation period.

In some embodiments, a start of the evaluation period is equivalent to a start of the set that is transmitted.

In some embodiments, a start of the evaluation period is after a start of the set that is transmitted but before a finish of that set.

In some embodiments, a length of the evaluation period is predetermined.

In some embodiments, a length of the evaluation period is based on a function. In some such embodiments, the function is based on at least one of the following parameters: periodicity; bandwidth; density; frequency range in which the set is configured; number of samples of the set that comprise reference signals; shortest possible evaluation period; discontinuous receive (DRX) configuration; gap configuration; and SMTC period.

In some embodiments, the method further comprises transmitting, by the network node, to the wireless device, the evaluation period.

In some embodiments, the method further comprises determining whether to use or not use the evaluation period.

In some embodiments, the method further comprises transmitting, by the network node, to the wireless device, an indication of whether to use or not use the evaluation period.

In some embodiments, said determining the evaluation period is responsive to determining whether to use or not use the evaluation period.

In some embodiments, the method further comprises obtaining a value of a parameter for a function that is used to determine the evaluation period. In some such embodiments, said determining the evaluation period is based on the parameter.

In some embodiments, the method further comprises transmitting, by the network node, to the wireless device, a value of a parameter for a function that is used by the wireless device to determine the evaluation period. In some such embodiments, the parameter is at least one of the following: periodicity; bandwidth; density; frequency range in which the set is configured; number of samples of the set that comprise reference signals; shortest possible evaluation period; discontinuous receive (DRX) configuration; gap configuration; and SMTC period.

In some embodiments, the method further comprises configuring at least one timer or counter of the wireless device that is related to the evaluation period.

Other embodiments of the present disclosure include a wireless device configured to determine an evaluation period that is common to at least a portion of reference signal resources in a set of reference signal resources that are transmitted by a network node, with at least one of the reference signal resources in the set being of a different type or configuration than another of the reference signal resources in the set. The wireless device is further configured to monitor channel quality of the portion of reference signal resources in the set that are received during the determined evaluation period.

In some embodiments, the wireless device is further configured to perform any of the methods described above with respect to the wireless device.

In some embodiments, the wireless device comprises processing circuitry and memory, the memory containing instructions executable by the processing circuitry whereby the wireless device is configured.

Other embodiments of the present disclosure include a network node configured to determine an evaluation period that is common to at least a portion of reference signal resources in a set of reference signal resources that are transmitted by the network node, with at least one of the reference signal resources in the set being of a different type or configuration than another of the reference signal resources in the set. The network node is further configured to configure the determined evaluation period so that a wireless device is operable to monitor channel quality of the portion of reference signal resources in the set that are transmitted during the determined evaluation period.

In some embodiments, the network node is further configured to perform any of the methods described above with respect to the network node.

In some embodiments, the network node comprises processing circuitry and memory, the memory containing instructions executable by the processing circuitry whereby the network node is configured.

Other embodiments of the present disclosure include a computer program comprising instructions which, when executed by at least one processor of a radio node (e.g., a wireless device or network node), causes the radio node to carry out any of the methods described above.

Other embodiments of the present disclosure include a carrier containing such a computer program. The carrier is one of an electronic signal, optical signal, radio signal, or computer readable storage medium.

Any of the embodiments described above may further comprise one or more of the features described below.

BRIEF DESCRIPTION OF THE DRAWINGS

Aspects of the present disclosure are illustrated by way of example and are not limited by the accompanying figures with like references indicating like elements. In general, the use of a reference numeral should be regarded as referring to the depicted subject matter according to one or more embodiments, whereas discussion of a specific instance of an illustrated element will append a letter designation thereto (e.g., discussion of a beam 410, generally, as opposed to discussion of particular instances of beams 410a, 410b, 410c, 410d, and 410e).

FIG. 2A is schematic diagram illustrating an example non-centralized NR deployment scenario, according to one or more embodiments of the present disclosure.

FIG. 2B is schematic diagram illustrating an example co-sited NR deployment scenario, according to one or more embodiments of the present disclosure.

FIG. 2C is schematic diagram illustrating an example centralized NR deployment scenario, according to one or more embodiments of the present disclosure.

FIG. 2D is schematic diagram illustrating an example shared NR deployment scenario, according to one or more embodiments of the present disclosure.

DETAILED DESCRIPTION

Figure 1:
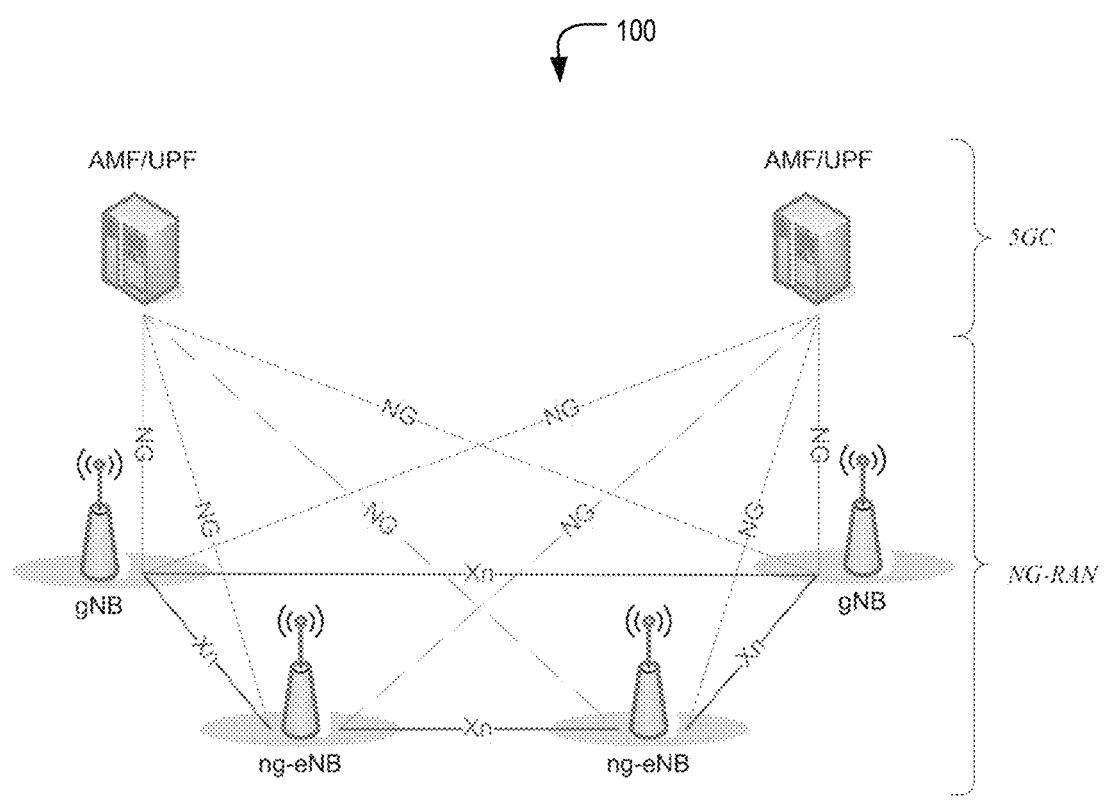
FIG. 1 is a schematic diagram illustrating an example NR architecture, according to one or more embodiments of the present disclosure.

In this disclosure the term eNB denotes a Long Term Evolution (LTE) eNodeB. The terms gNB and ng-eNB (or evolved eNB) denote NR base stations (BSs) (one NR BS may correspond to one or more transmission/reception points). FIG. 1 illustrates an example NR architecture 100, according to one or more embodiments of the present disclosure. The NR architecture 100 comprises a 5G core (5GC) and an NG Radio Access Network (NG-RAN). The 5GC comprises a plurality of Access Management Function (AMF)/User Plane Function (UPF) nodes. The NG-RAN comprises a plurality of gNBs and a plurality of NG-eNBs. Each of the AMF/UPF nodes has an NG interface to each of the nodes in the NG-RAN. The nodes within the NG-RAN may have an Xn interface to any other of the nodes in the NG-RAN.

According to embodiments of the present disclosure, an LTE BS and an NR BS may be deployed according to a variety of scenarios. A few examples of such scenarios are illustrated in FIGS. 2A-2D.

In particular, FIG. 2A illustrates an example non-centralized deployment scenario in which two NR BSs and an LTE eNB are not co-sited with each other. Each of the base stations is connected to a core network (CN) by a RAN-CN interface. The BSs may be connected to each other by an inter-BS interface.

FIG. 2B illustrates an example co-sited deployment scenario in which two sites each include LTE and NR functionality, and each site is connected to the CN.

FIG. 2C illustrates an example centralized deployment scenario in which a central unit/upper layer of NR BS functionality is connected to CN, and has an interface to a plurality of NR BS lower layers supported by the same NR BS central unit/upper layer.

FIG. 2D illustrates an example shared deployment scenario in which each of a plurality of NR BSs supports a plurality of core operators. That is, each NR BS is shared by a plurality of core operators.

Figure 3:
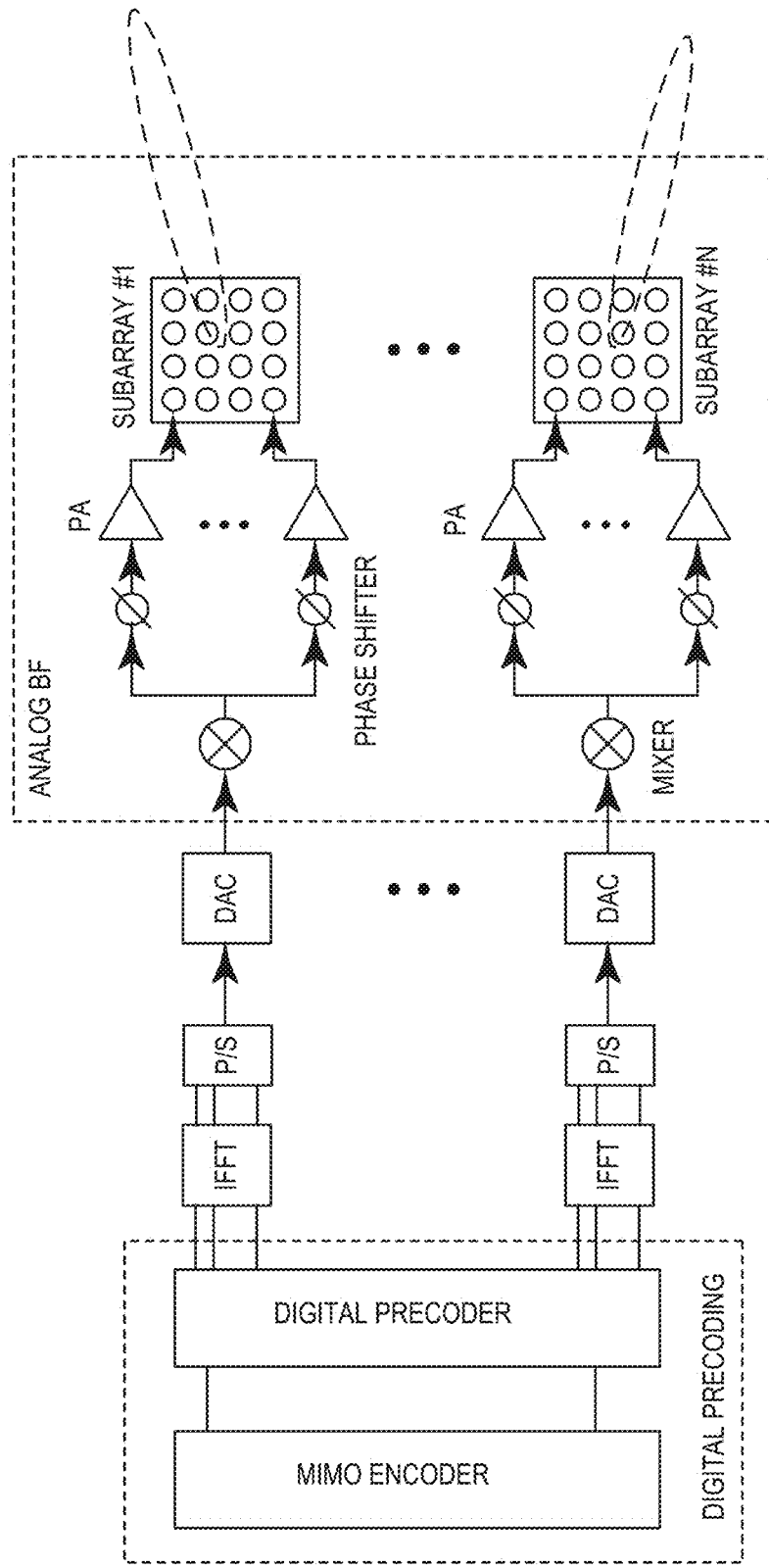
FIG. 3 is a schematic diagram illustrating an example of hybrid beamforming.

A BS may support one or more multi-antenna schemes. For NR, frequency ranges up to 100 GHz are likely to be adopted. High-frequency radio communication above 6 GHz suffers from significant path loss and penetration loss. Accordingly, embodiments of the present disclosure intended for use in NR may include massive Multiple Input Multiple Output (MIMO) schemes. In particular, various embodiments of the present disclosure include analog, digital, and hybrid (i.e., a combination of analog and digital) approaches to beamforming. An example of hybrid beamforming according to particular embodiments is depicted in FIG. 3. As shown in FIG. 3, a digital precoding system comprising a MIMO encoder and digital precoder may provide output to a plurality of Inverse Fast Fourier Transform (IFFT) units or modules. Each of the IFFT units or modules outputs to a respective parallel-to-serial converter, which outputs to a respective digital-to-analog converter (DAC). Each DAC outputs to respective analog beamforming circuitry for transmission of signals via a subarray of antennas. According to embodiments, beamforming can be on transmission beams and/or reception beams. Beamforming may also be on the network side or UE side.

The analog beam of a subarray can be steered toward a single direction on each Orthogonal Frequency Division Multiplexing (OFDM) symbol. Hence the number of subarrays determines the number of beam directions and the corresponding coverage on each OFDM symbol. However, the number of beams to cover the whole serving area is typically larger than the number of subarrays, especially when the individual beam-width is narrow. Therefore, to cover the whole serving area, multiple transmissions with narrow beams differently steered in time domain are also likely to be needed. The provision of multiple narrow coverage beams for this purpose has been called "beam sweeping". For analog and hybrid beamforming, beam sweeping will likely be used to provide the basic coverage in NR. For this purpose, multiple OFDM symbols, in which differently steered beams can be transmitted through subarrays, can be assigned and periodically transmitted.

Figure 4A:
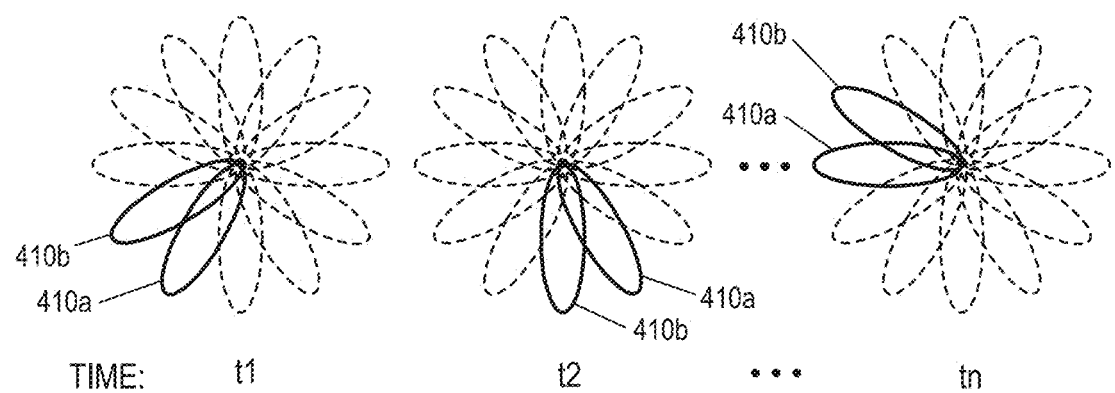
FIG. 4A is a schematic diagram illustrating an example of transmission beam sweeping on two subarrays, according to one or more embodiments of the present disclosure.
Figure 4B:
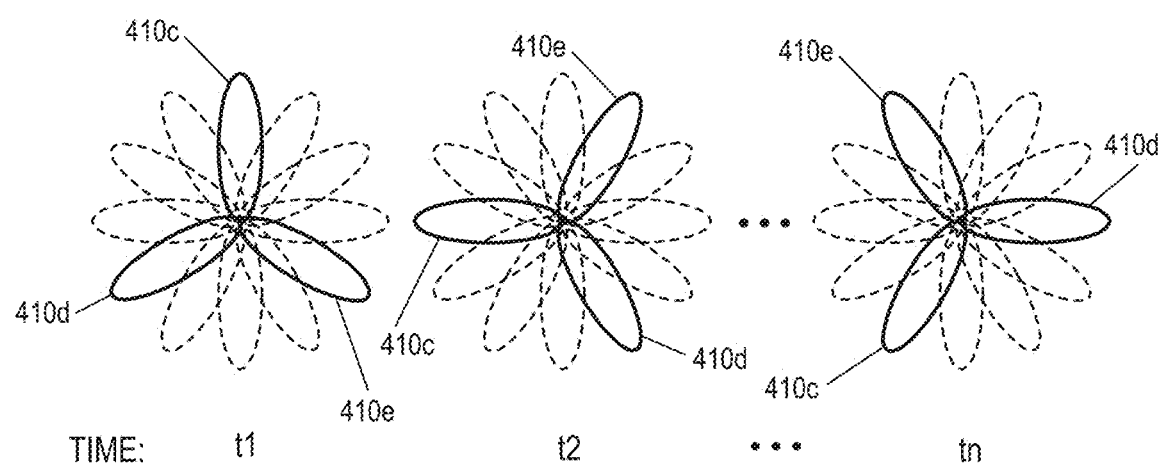
FIG. 4B is a schematic diagram illustrating an example of transmission beam sweeping on three subarrays, according to one or more embodiments of the present disclosure.

Beam sweeping may be performed in a variety of different ways. FIGS. 4A and 4B illustrate a couple of examples of transmission beam sweeping over time. In particular, FIG. 4A illustrates an example of transmission beam sweeping on two subarrays, according to one or more embodiments of the present disclosure. In this example, a transmission beam 410a, 410b extends from each of the subarrays, and are each swept in a counter-clockwise direction. According to this example, the beams 410a, 410b are spaced relatively close together.

FIG. 4B illustrates another example of transmission beam sweeping. The example of FIG. 4B uses three subarrays which also sweep beams 410c, 410d, 410e in a counter-clockwise direction. The beams 410c, 410d, 410e in this example are spaced relatively evenly apart.

A synchronization signal (SS) transmitted on a beam 410 may be used for measurements on an NR carrier, including intra-frequency, inter-frequency and inter-RAT (i.e., NR measurements from another RAT). In some embodiments, SS block configuration is used for an SS. In some embodiments, SS burst configuration is used for an SS.

In SS block (which may also be referred to as SS/PBCH block or SSB), a Primary Synchronization Signal (PSS), Secondary Synchronization Signal (SSS) and/or Physical Broadcast Channel (PBCH) can be transmitted within an SS block. The Physical Broadcast Channel (PBCH) contains parts of the basic system information that the wireless device (e.g., UE) uses to access the system. For a given frequency band, an SS block corresponds to N OFDM symbols based on one subcarrier spacing (e.g., default or configured), and N is a constant. The UE may be able to identify at least an OFDM symbol index, slot index in a radio frame, and radio frame number from an SS block. At least for a multi-beam case, the time index of SS-block is conveyed to the UE.

An SS burst set (or series) comprises one or multiple SS blocks where the number of SS blocks within an SS burst set is finite. From the physical layer specification perspective, at least one periodicity of SS burst set is supported. From the UE perspective, SS burst set transmission is periodic. At least for initial cell selection, the UE may assume a default periodicity of SS burst set transmission for a given carrier frequency (e.g., one of 5 ms, 10 ms, 20 ms, 40 ms, 80 ms, or 160 ms). UE may assume that a given SS block is repeated with a SS burst set periodicity. By default, the UE may neither assume the network node (e.g., gNB) transmits the same number of physical beam(s), nor the same physical beam(s) across different SS-blocks within an SS burst set.

The maximum number of SS-blocks within SS burst set, L, for frequency range up to 3 GHz, L is 4. The maximum number of SS-blocks within SS burst set, L, for frequency range from 3 GHz to 6 GHz, L is 8. The maximum number of SS-blocks within SS burst set, L, for frequency range from 6 GHz to 52.6 GHz, L is 64.

A single set of possible SS block time locations (e.g., with respect to radio frame or with respect to SS burst set) is specified per frequency band. The network may or may not transmit SS blocks in these specified time locations, according to various embodiments. The number of actual transmitted SS blocks may be different in different cells.

The position(s) of actual transmitted SS-blocks can be informed for helping CONNECTED/IDLE mode measurements, for helping CONNECTED mode UE to receive DL data/control in unused SS-blocks and potentially for helping IDLE mode UE to receive DL data/control in unused SS-blocks.

Figure 5:
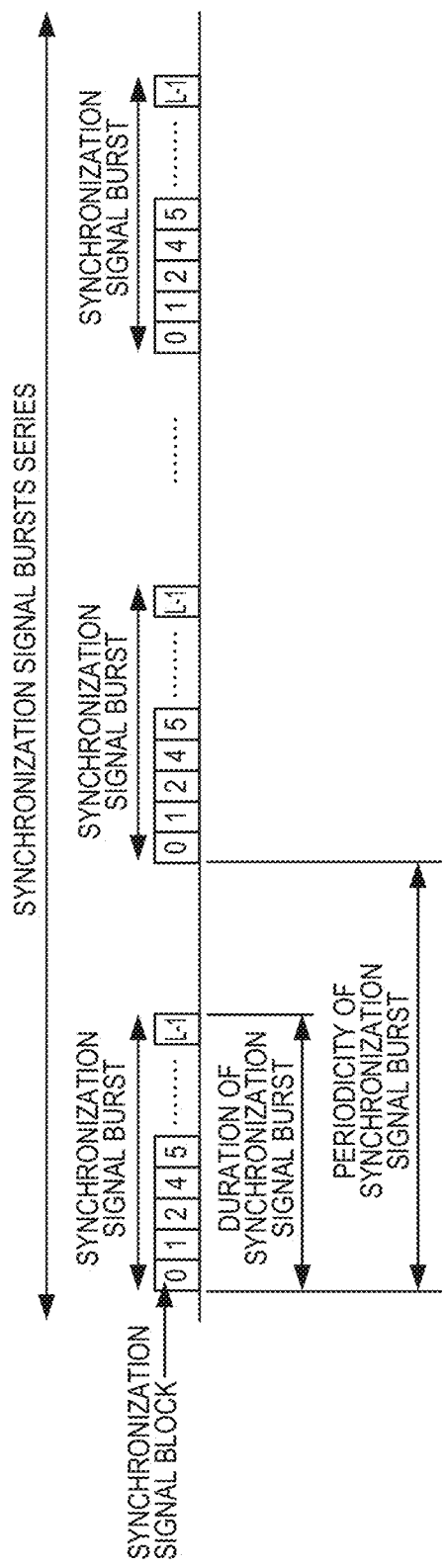
FIG. 5 is a timeline diagram illustrating an example configuration of SS blocks, SS bursts, and SS burst sets/series, according to one or more embodiments of the present disclosure.

For each carrier, the SS blocks may be time-aligned or overlap fully or at least in part, or the beginning of the SS blocks may be time-aligned (e.g., when the actual number of transmitted SS blocks is different in different cells). FIG. 5 illustrates an example configuration of SS blocks, SS bursts, and SS burst sets/series. According to the example of FIG. 5, a plurality of SS blocks form an SS burst that repeats with a certain periodicity. The periodic SS bursts form an SS burst set/series.

According to this example, all of the SS blocks within the burst set are within a 5 ms window, but the number of SS blocks within such window depends on the numerology and the value of L (e.g., up to 64 SS blocks with 240 kHz subcarrier spacing (SCS)).

Figure 6:
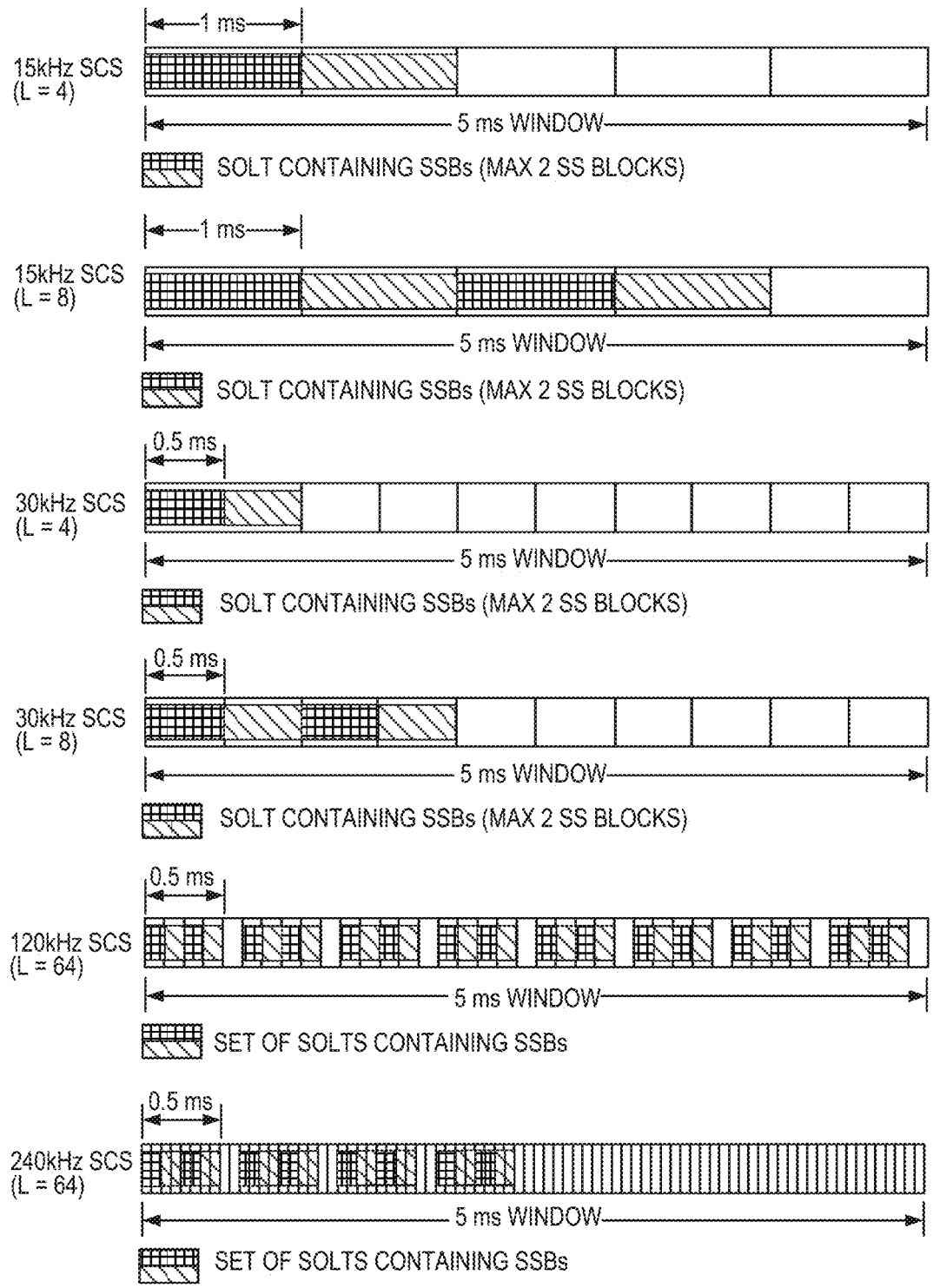
FIG. 6 is a schematic diagram illustrating an example mapping of SS blocks within a time slot and within a 5 ms window, according to one or more embodiments of the present disclosure.

An example mapping for SS blocks within a time slot and within a 5 ms window is illustrated in FIG. 6. The mapping illustrated in FIG. 6 shows example SS blocks configured according to different combinations of SCS and L. In particular, FIG. 6 illustrates an example mapping using a 15 kHz SCS with L=4, a 15 kHz SCS with L=8, a 30 kHz SCS with L=4, a 30 kHz SCS with L=8, a 120 kHz SCS with L=64, and a 240 kHz SCS with L=64.

As briefly discussed above, the purpose of RLM is, traditionally, to monitor the radio link quality of the serving cell of the UE and use that information to decide whether the UE is in-sync or out-of-sync with respect to that serving cell. In LTE, a UE may perform RLM by measuring on downlink reference symbols (e.g., a Cell Specific Reference Signal (CRS)) while in the RRC_CONNECTED state. If the RLM process generates a certain number of consecutive out-of-sync (OOS) indications, the UE starts a Radio Link Failure (RLF) procedure and declares RLF after the expiry of an RLF timer (e.g., the T310 timer). The actual RLM procedure may be carried out by comparing the estimated downlink reference symbol measurements to one or more thresholds (e.g., some target Block Error Rate (BLER), Qout, and/or Qin). Qout and Qin correspond to the BLER of hypothetical Physical Downlink Control Channel (PDCCH)/Physical Control Format Indicator Channel (PCFICH) transmissions from the serving cell. Examples of Qout and Qin are 10% and 2% respectively.

Figure 7:
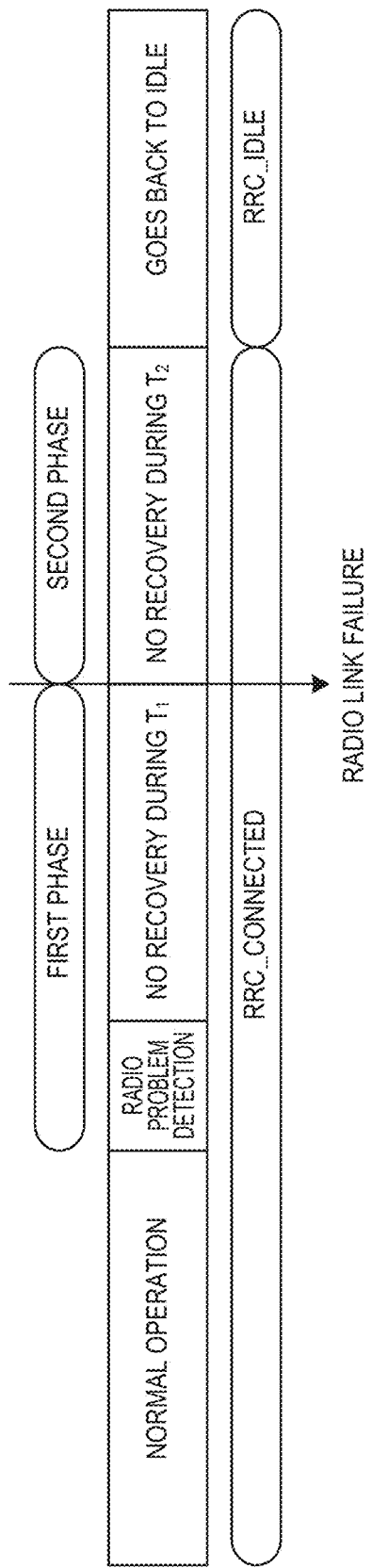
FIG. 7 is a schematic diagram illustrating an example RLF procedure, according to one or more embodiments of the present disclosure.

FIG. 7 illustrates an example RLF procedure according to one or more embodiments of the present disclosure, and which may be suitable for use with a variety of radio communication technologies, e.g., LTE. The RLF procedure has two phases. The first phase starts upon radio problem detection and leads to radio link failure detection. The second phase (RRC recovery) starts upon radio link failure detection or handover failure and leads to RRC_IDLE in case the RRC recovery fails.

According to one or more single carrier and Carrier Aggregation (CA) embodiments, re-establishment is triggered when the Primary Cell (PCell) experiences RLF. The UE does not monitor the RLF of Secondary Cells (SCells), which may instead be monitored by the eNB.

According to one or more Dual Connectivity (DC) embodiments, the first phase of the RLF procedure is supported for PCell and Primary SCell (PSCell). Re-establishment is triggered when the PCell experiences RLF. However, upon detecting RLF on the PSCell, the re-establishment procedure is not triggered at the end of the first phase. Instead, the UE informs the radio link failure of the PSCell to the Master eNB (MeNB).

In addition to the RLM on layer 1 (L1), RLF may also be triggered by layer 2 (L2), which is then reported to layer 3 (L3). L2-triggering may be, e.g., upon indication from Radio Link Control (RLC) that the maximum number of retransmissions has been reached or upon random access problem indication from Media Access Control (MAC).

Notwithstanding the above, RLM in NR may be performed based on up to 8 (preliminary) RLM Reference Signal (RLM-RS) resources configured by the network. In particular, one RLM-RS resource can be either one SS/PBCH block or one Channel State Information (CSI) Reference Signal (CSI-RS) resource/port, and the RLM-RS resources may be UE-specifically configured. When a UE is configured to perform RLM on one or multiple RLM-RS resource(s), periodic IS (in-sync) may be indicated if the estimated link quality corresponding to hypothetical PDCCH BLER based on at least Y=1 RLM-RS resource among all configured X RLM-RS resource(s) is above Q_in threshold. Periodic OOS (out-of-sync) may be indicated if the estimated link quality corresponding to hypothetical PDCCH BLER based on all configured X RLM-RS resource(s) is below Q_out threshold.

Thus, unlike in LTE, an NR UE may be configured with multiple RLM-RS resources which can be up to 8, which may present one or more challenges. For example, the configured RLM-RS resources may be of different types and thus expectedly may have completely different configurations. For example, a first type of configured RLM-RS resource may be SSB, whereas a second type of configured RLM-RS resource may be CSI-RS. Additionally or alternatively, the configured RLM-RS resources may have different configurations even being of the same type, e.g., CSI-RS transmitted on one beam and/or in one part of the system bandwidth can have a different configuration (e.g., periodicity, density in time and/or frequency, bandwidth, transmit power or boosting) compared to CSI-RS on another beam and/or another part of the system bandwidth. Furthermore, there may be different hypothetical channel or signal configurations associated with different RLM-RS resources. In such scenarios, it may be unclear how to define an RLM evaluation period in NR.

Certain aspects of the present disclosure and their embodiments may provide solutions to these or other challenges. Particular embodiments herein include methods for a UE and methods for a network node.

In one embodiment, when a UE is configured with multiple RLM-RS resources, a common evaluation period is determined for a subset or for all configured RLM-RS resources. In a further embodiment, the common evaluation period may comprise the same length of the evaluation period for the subset or for all configured RLM-RS resources, but not necessarily the same beginning of the evaluation period. In another embodiment, the common evaluation period may comprise the same length and the same beginning of the evaluation period for the subset or for all configured RLM-RS resources. The common evaluation period may be a fixed value or determined based on a function.

In one example, one or more evaluation periods are determined by a network node which then configures the UE with the determined evaluation periods. In a further example, a network node may indicate that a common evaluation period is to be used and may even configure a specific value (e.g., the total time in ms) which may be obtained based on a function F( ) described below.

In another example, UE determines (e.g., based on a pre-defined rule or function F( ) and/or message received from a network node) one or more evaluation periods and uses them while assessing the radio link quality during RLM.

In a further example, the common evaluation period is a default evaluation period, unless configured differently by a network node.

Systems and methods for UEs and systems and methods for network nodes are described herein.

In one embodiment, when a UE is configured with multiple RLM-RS resources, a common evaluation period is determined for a subset or for all configured RLM-RS resources. In a further embodiment, the common evaluation period may comprise the same length of the evaluation period for the subset or for all configured RLM-RS resources, but not necessarily the same beginning of the evaluation period. In another embodiment, the common evaluation period may comprise the same length and the same beginning of the evaluation period for the subset or for all configured RLM-RS resources. The common evaluation period may be a fixed value or determined based on a function.

In one example, one or more evaluation periods are determined by a network node which then configures the UE with the determined evaluation periods. In a further example, a network node may indicate that a common evaluation period is to be used and may even configure a specific value (e.g., the total time in ms) which may be obtained based on a function F( ) described below.

In another example, UE determines (e.g., based on a pre-defined rule or function F( ) and/or message received from a network node) one or more evaluation periods and uses them while assessing the radio link quality during RLM.

In a further example, the common evaluation period is a default evaluation period, unless configured differently by a network node.

Certain embodiments may, among other things, provide lower UE complexity, well-specified UE behavior, and/or lower complexity to handle RLM indications (in-sync and out-of-sync), which may be challenging if evaluation periods are different for all RLM-RS resources.

Figure 8:
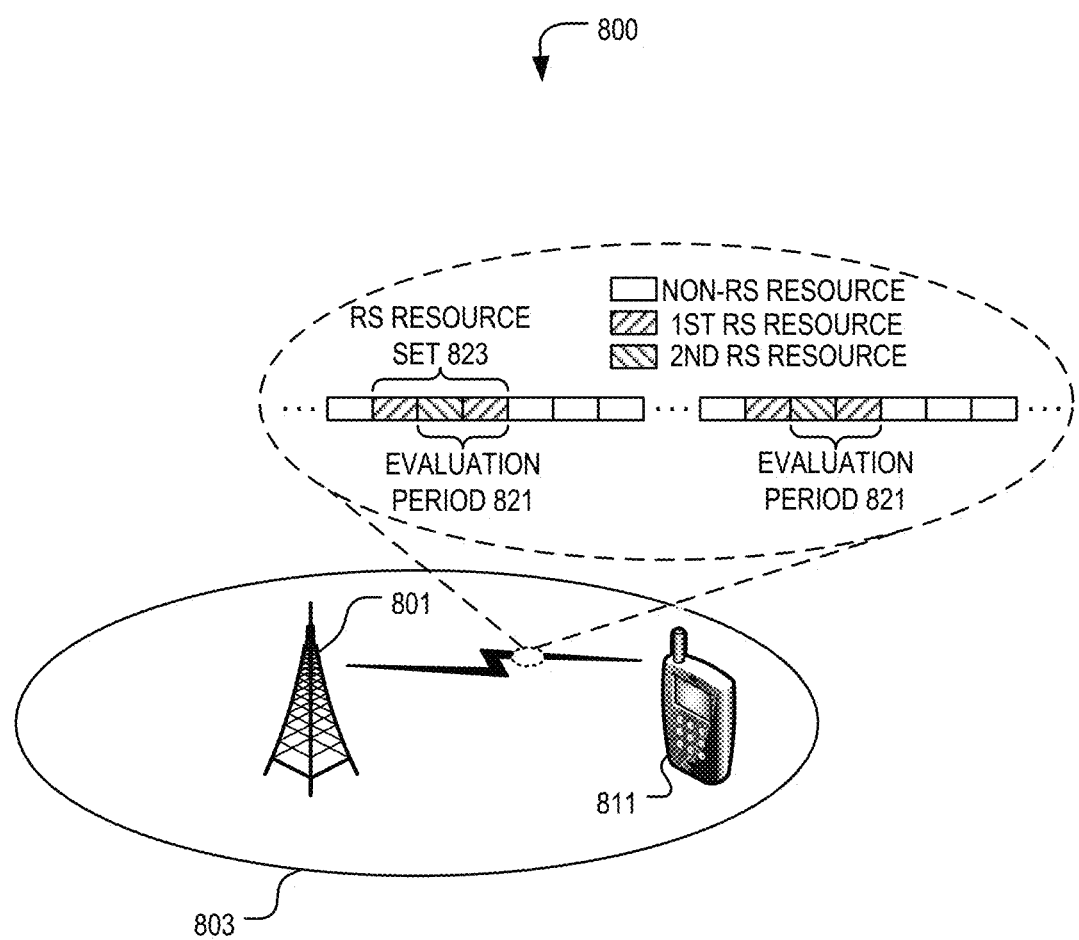
FIG. 8 is a schematic diagram illustrating an example system for configuring an evaluation period, according to one or more embodiments of the present disclosure.

FIG. 8 illustrates one embodiment of a system 800 for configuring an evaluation period in accordance with various aspects as described herein. In FIG. 8, the system 800 may include a network node 801 (e.g., base station, gNB) and a wireless device 811 (e.g., UE). In one embodiment, the network node 801 may be associated with cell 803. In one example, a cell 803 is a carrier in a sector of a base station. The network node 801 may determine at least a portion of reference signal (RS) resources in a set 823 of reference signal resources (e.g., RLM-RS resources) that are transmitted by the network node 801 that correspond to an evaluation period 821. Further, at least one of the reference signal resources in the set 823 is of a different type (e.g., SS/PBCH blocks, CSI-RS resource/port) or configuration (e.g., periodicity, density in time or frequency, bandwidth, transmit power or boosting) than another of the reference signal resources in the set 823. In FIG. 8, the set 823 is indicated as having first and second reference signal resources with a different type or configuration. The network node 801 determines the evaluation period 821 that is common to the determined portion of reference signal resources in the set 823. Further, the network node 801 configures the determined evaluation period 821 so that a wireless device 811 is operable to monitor channel quality of the portion of reference signal resources in the set 823 that are transmitted during the determined evaluation period 821. Also, the network node 801 may configure at least one time or counter of the wireless device 811 that is related to the evaluation period 821.

In one embodiment, the wireless device 811 may determine at least a portion of reference signal resources in the set 823 of reference signal resources that are transmitted by the network node 801 that correspond to the evaluation period 821. Further, at least one of the reference signal resources in the set 823 is of a different type or configuration than another of the reference signal resources in the set 823. The wireless device 811 determines the evaluation period 821 that is common to the determined portion of reference signal resources in the set 823. Also, the wireless device 811 monitors channel quality of the portion of reference signal resources in the set 823 that are received during the determined evaluation period 821. The wireless device 811 may then determine whether the wireless device 811 is in-sync or out-of-sync with the network node 801 based on this channel quality information.

In FIG. 8, the network node 801 may be configured to support one or more communication systems such as LTE, UMTS, GSM, NB-IoT, 5G New Radio (NR), the like, or any combination thereof. Further, the network node 801 may be a base station, an access point, or the like. Also, the network node 801 may serve wireless device 811. The wireless device 811 may be configured to support one or more communication systems such as LTE, UMTS, GSM, NB-IoT, 5G NR, the like, or any combination thereof.

Note that the apparatuses described herein may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 9:
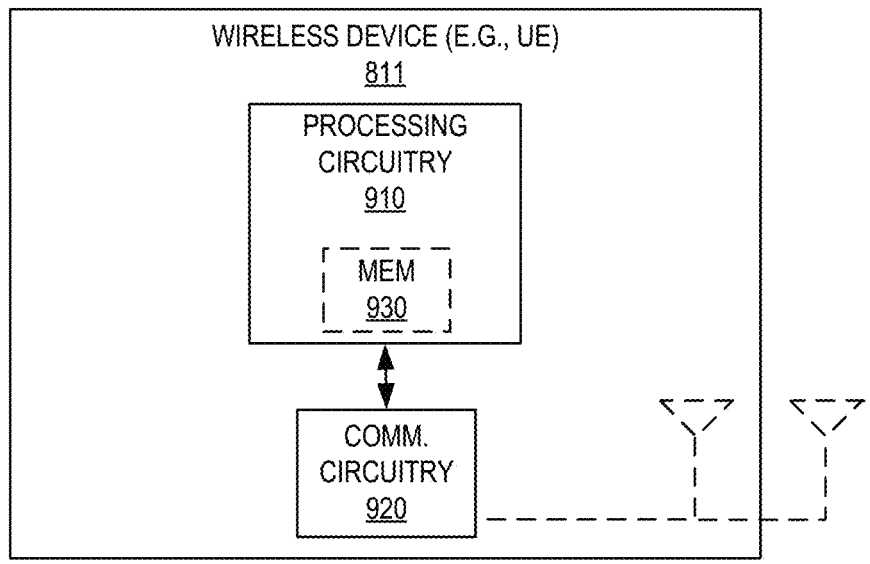
FIGS. 9 and 10 are schematic diagrams illustrating an example wireless device, according to one or more embodiments of the present disclosure.

For example, FIG. 9 illustrates one embodiment of a wireless device 811 in accordance with various embodiments described herein. As shown, the wireless device 811 includes processing circuitry 910 and communication circuitry 920. The communication circuitry 920 (e.g., radio circuitry) is configured to transmit and/or receive information to and/or from one or more other nodes, e.g., via any communication technology. Such communication may occur via one or more antennas that are either internal or external to the wireless device 811. The processing circuitry 910 is configured to perform processing described herein, such as by executing instructions stored in memory 930. The processing circuitry 910 in this regard may implement certain functional means, units, or modules.

Figure 10:
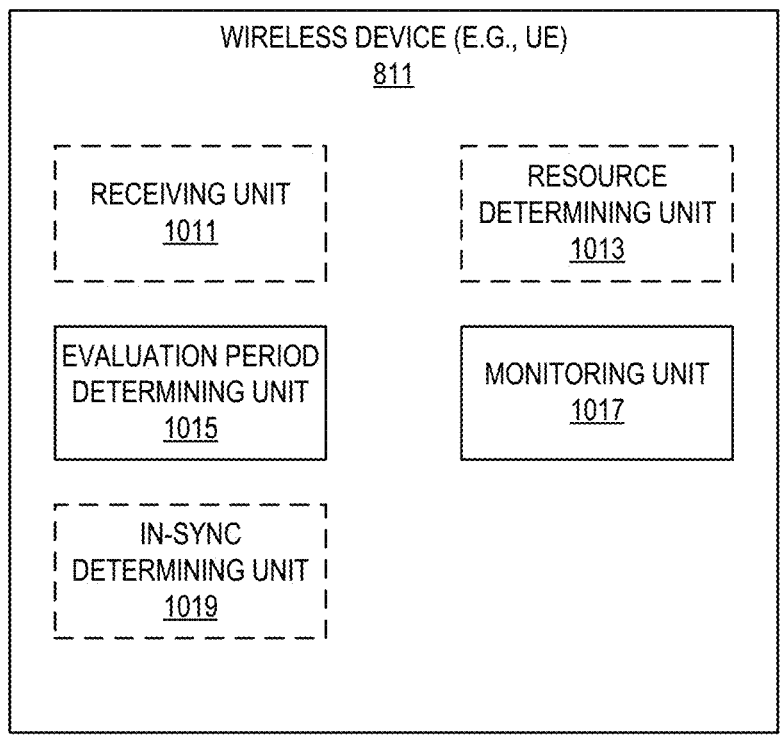
Figure 16:
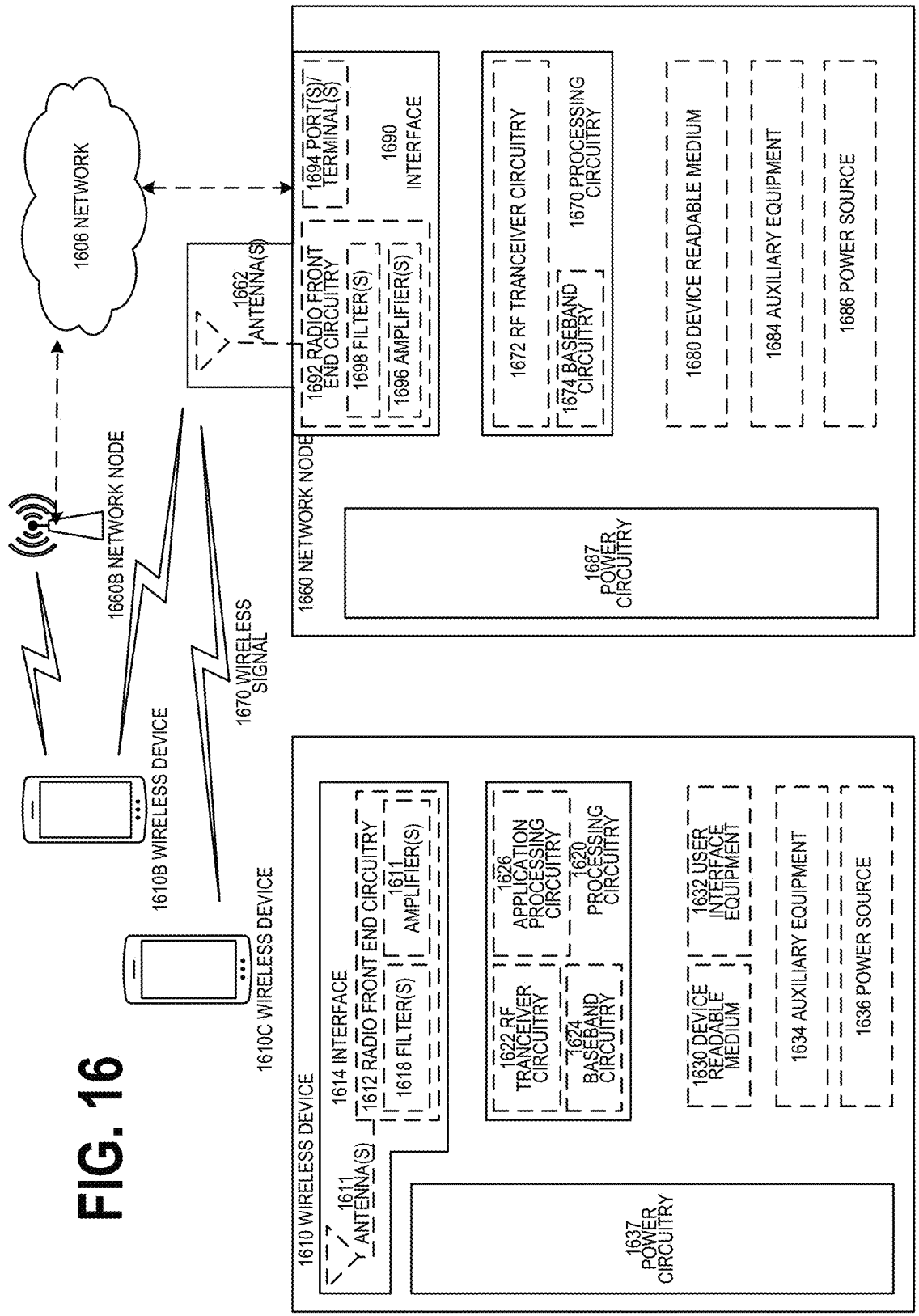
FIG. 16 is a schematic block diagram illustrating an example wireless network, according to particular embodiments of the present disclosure.

FIG. 10 illustrates a schematic block diagram of one embodiment of a wireless device 811 in a wireless network in accordance various embodiments described herein (for example, the wireless network shown in FIG. 8 and FIG. 16). As shown, the wireless device 811 implements various functional means, units, or modules, e.g., via the processing circuitry 910 in FIG. 9 and/or via software code. In one embodiment, these functional means, units, or modules, e.g., for implementing the method(s) herein, may include for instance: a receiving unit 1011 for receiving an indication of whether to use an evaluation period, a resource determining unit 1013 for determining at least a portion of reference signal resources in a set 823 of reference signal resources that are transmitted by the network node 801 that correspond to the evaluation period, an evaluation period determining unit 1015 for determining the evaluation period that is common to the determined portion of reference signal resources in the set 823, a monitoring unit 1017 for monitoring channel quality of the portion of reference signal resources in the set 823 that are received during the determined evaluation period, and an in-sync or out-of-sync determining unit 1019 for determining whether the wireless device 811 is in-sync or out-of-sync with the network node 801 based on the channel quality of the portion of reference signal resources in the set 823 that are received during the evaluation period.

Figure 11:
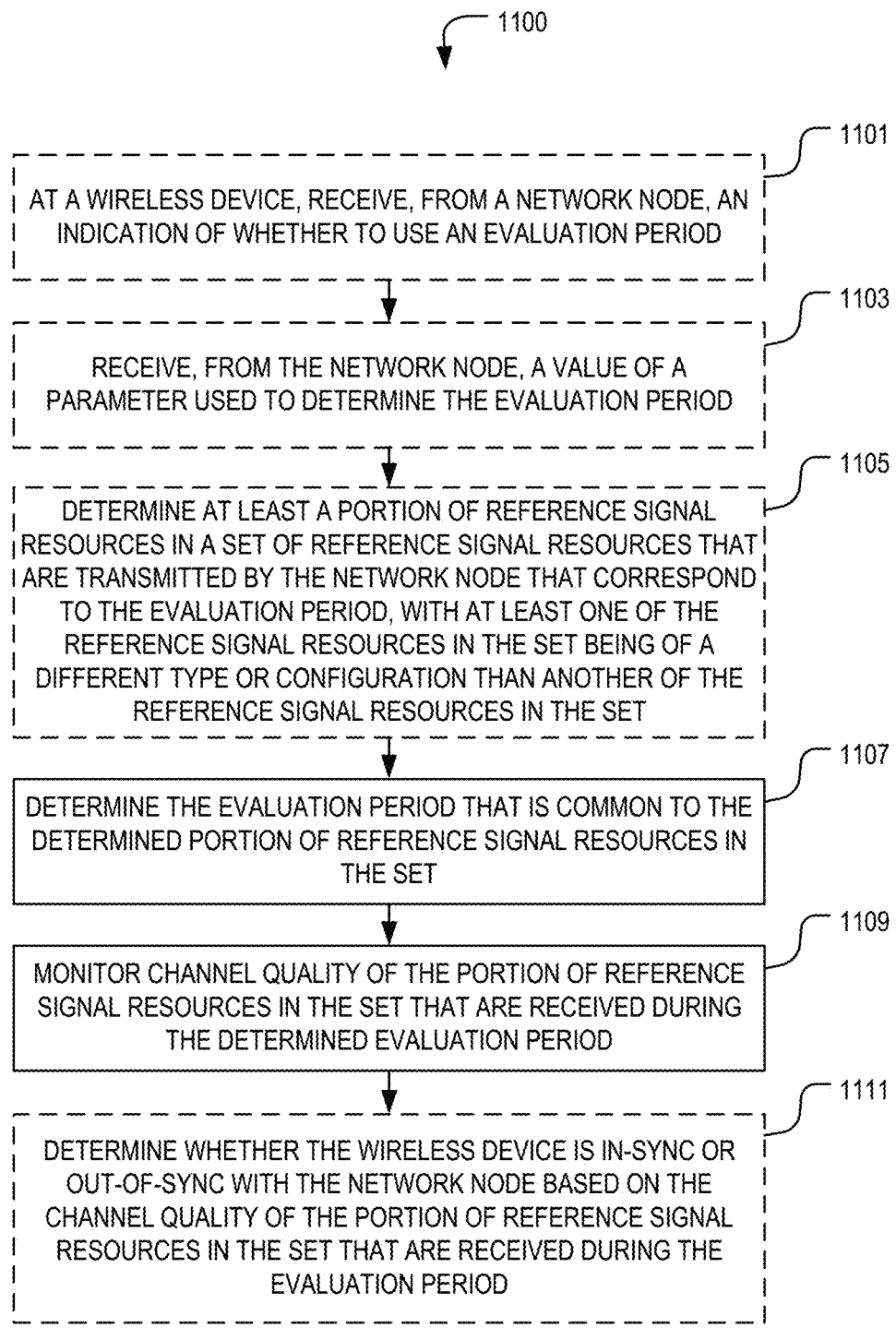
FIG. 11 is a flow diagram illustrating an example method implemented by a wireless device, according to one or more embodiments of the present disclosure.
Figure 25:
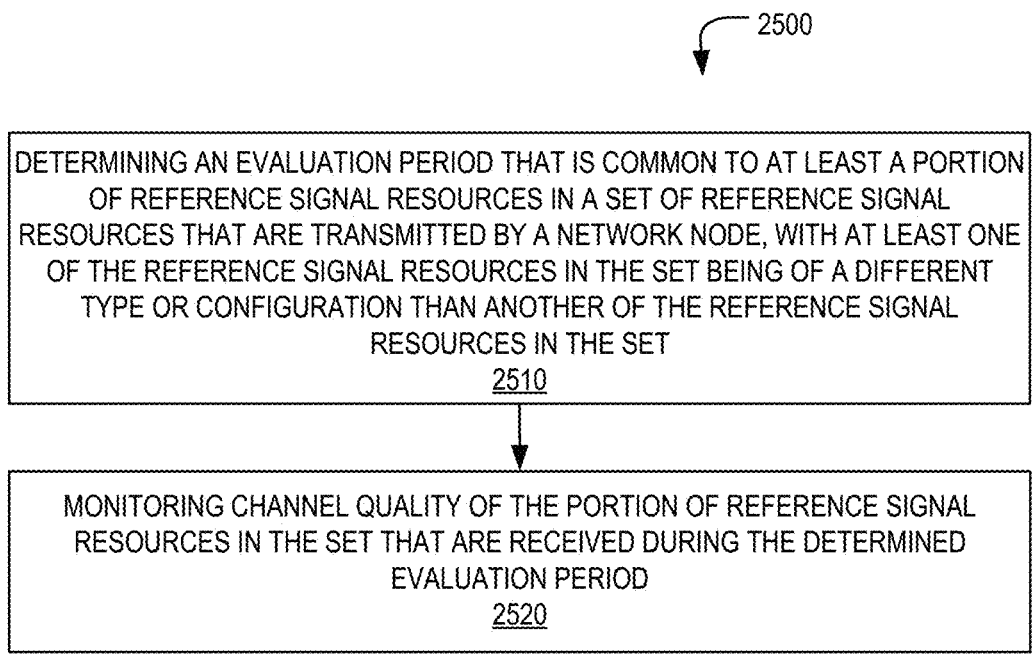

FIGS. 11 and 25 illustrate examples of methods 1100, 2500 performed by a wireless device 811 for configuring an evaluation period in accordance with certain embodiments of the present disclosure.

As shown in FIG. 11, the method 1100 comprises determining an evaluation period 821 that is common to a portion of the reference signal resources in the set 823 (block 1107). The method further comprises monitoring channel quality of the portion of reference signal resources in the set 823 that are received during the determined evaluation period 821 (block 1109).

In some embodiments, the method 1100 further comprises the wireless device 811 receiving, from a network node 801, an indication of whether to use an evaluation period 821 (block 1101). In some embodiments, the method 1100 further comprises receiving, from the network node 801, a value of a parameter used to determine the evaluation period 821 (block 1103). In some embodiments, the method 1100 further comprises determining at least a portion of reference signal resources in the set 823 of reference signal resources that are transmitted by the network node 801 that correspond to the evaluation period, with at least one of the reference signal resources in the set 823 being of a different type or configuration than another of the reference signal resources in the set 823 (block 1105).

In some embodiments, the method 1100 further comprises determining whether the wireless device 811 is in-sync or out-of-sync with the network node 801 based on the channel quality of the portion of reference signal resources in the set 823 that are received during the evaluation period 821 (block 1111).

As shown in FIG. 25, the method 2500 comprises determining an evaluation period 821 that is common to at least a portion of reference signal resources in a set 823 of reference signal resources that are transmitted by a network node 801, with at least one of the reference signal resources in the set 823 being of a different type or configuration than another of the reference signal resources in the set 823 (block 2510). The method 2500 further comprises monitoring channel quality of the portion of reference signal resources in the set 823 that are received during the determined evaluation period 821 (block 2520).

Figure 12:
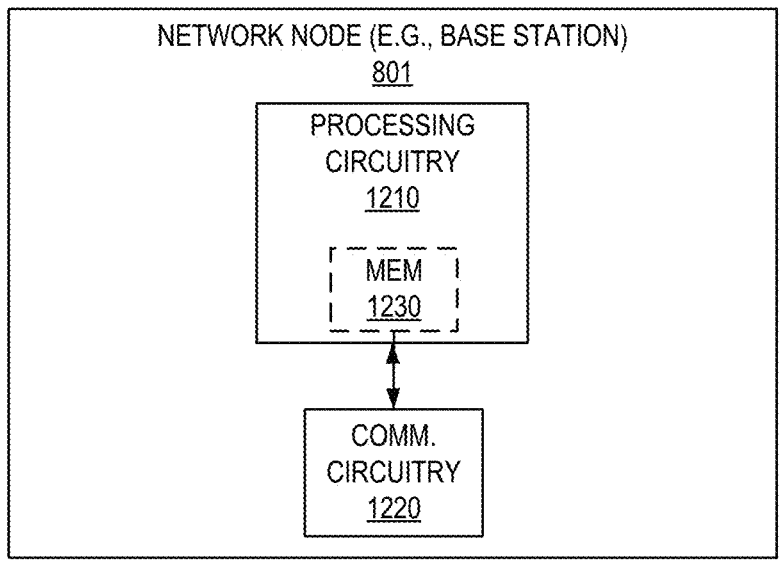
FIGS. 12 and 13 are schematic diagrams illustrating an example network node, according to one or more embodiments of the present disclosure.

FIG. 12 illustrates a network node 801 as implemented in accordance various embodiments described herein. As shown, the network node 801 includes processing circuitry 1210 and communication circuitry 1220. The communication circuitry 1220 is configured to transmit and/or receive information to and/or from one or more other nodes, e.g., via any communication technology. The processing circuitry 1210 is configured to perform processing described above, such as by executing instructions stored in memory 1230. The processing circuitry 1210 in this regard may implement certain functional means, units, or modules.

Figure 13:
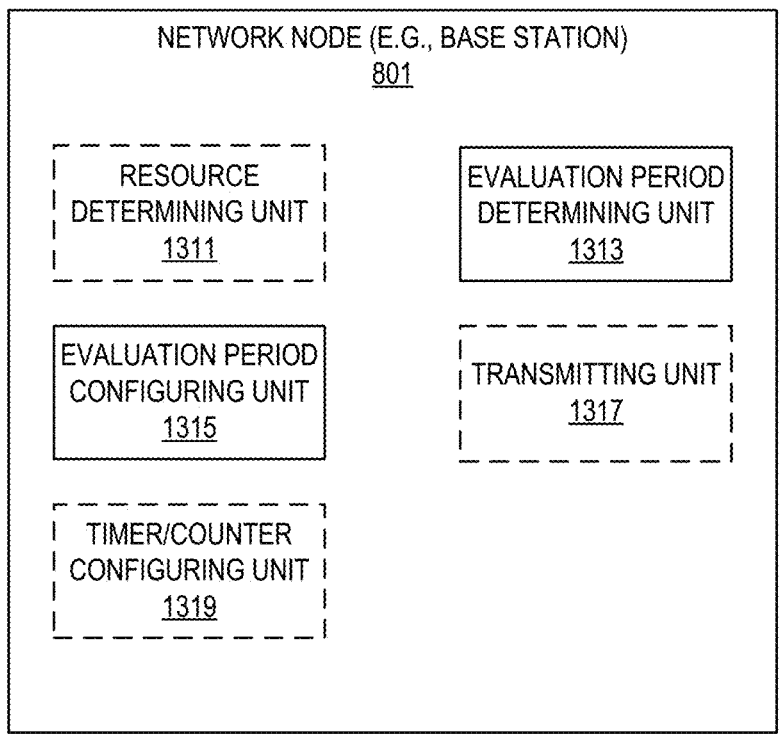

FIG. 13 illustrates a schematic block diagram of one embodiment of a network node 801 in a wireless network in accordance various embodiments described herein (for example, the network node 801 shown in FIG. 8 and FIG. 16). As shown, the network node 801 implements various functional means, units, or modules, e.g., via the processing circuitry 1210 in FIG. 12 and/or via software code. In one embodiment, these functional means, units, or modules, e.g., for implementing the method(s) herein, may include for instance: a resource determining unit 1311 for determining at least a portion of reference signal resources in a set 823 of reference signal resources that are transmitted by the network node 801 that correspond to the evaluation period, an evaluation period determining unit 1013 for determining the evaluation period that is common to the determined portion of reference signal resources in the set 823, an evaluation period configuring unit 1015 for configuring the determined evaluation period so that a wireless device 811 is operable to monitor channel quality of the portion of reference signal resources in the set 823 that are transmitted during the determined evaluation period, a transmitting unit 1017 for transmitting an indication of whether to use the evaluation period, and a timer/counter configuring unit 1019 for configuring at least one timer or counter of the wireless device 811 that is related to the evaluation period.

Figure 14:
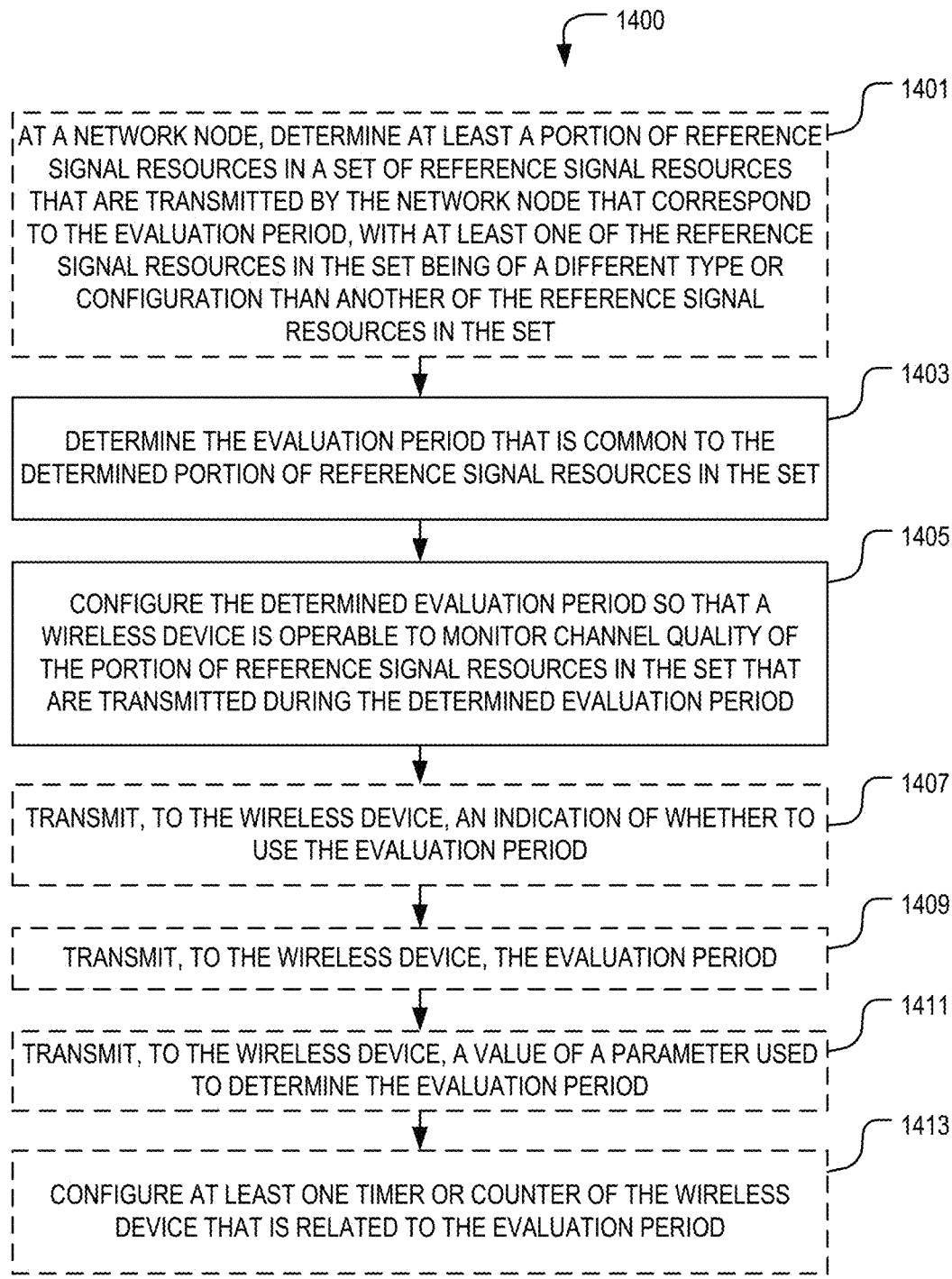
FIG. 14 is a flow diagram illustrating an example method implemented by a network node, according to one or more embodiments of the present disclosure.
Figure 26:
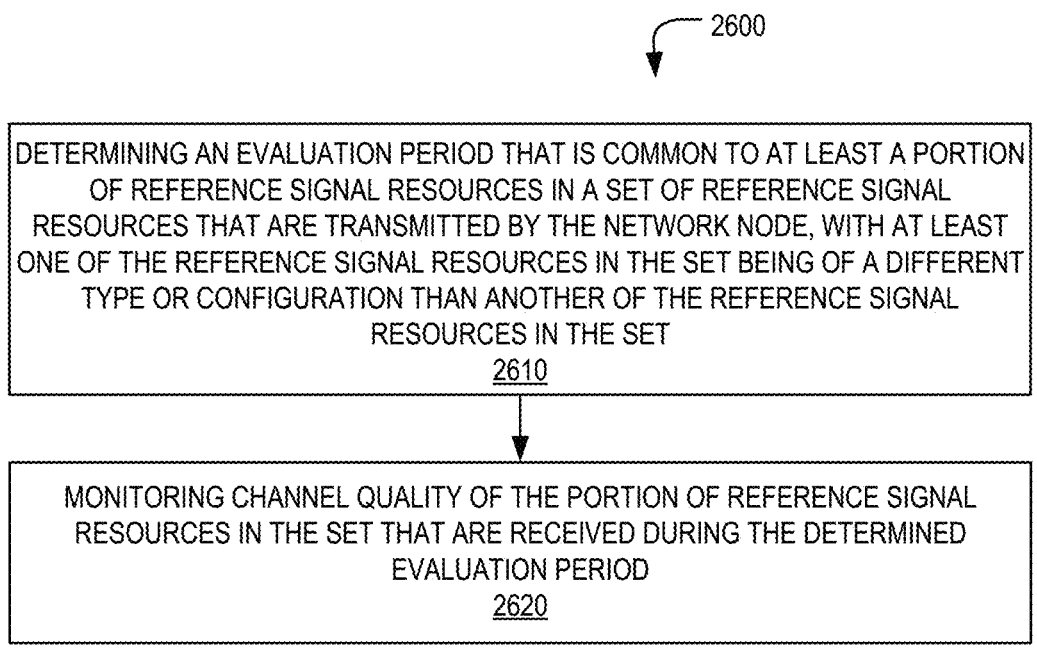

FIGS. 14 and 26 illustrate example methods 1400, 2600 performed by a network node 801 for configuring an evaluation period 821 in accordance with certain embodiments of the present disclosure.

As shown in FIG. 14, the method 1400 comprises determining the evaluation period 821 that is common to a portion of reference signal resources in a set 823 (block 1403). The method further comprises configuring the determined evaluation period 821 so that a wireless device 811 is operable to monitor channel quality of the portion of reference signal resources in the set 823 that are transmitted during the determined evaluation period 821 (block 1405).

In some embodiments, the method 1400 further comprises, at the network node 801, determining at least a portion of reference signal resources in the set 823 of reference signal resources that are transmitted by the network node 801 that correspond to the evaluation period 821, with at least one of the reference signal resources in the set 823 being of a different type or configuration than another of the reference signal resources in the set 823 (block 1401).

In some embodiments, the method 1400 further comprises transmitting, to the wireless device 811, an indication of whether to use the evaluation period 821 (block 1407). In some embodiments, the method 1400 further comprises transmitting, to the wireless device 811, the evaluation period 821 (block 1409). In some embodiments, the method 1400 further comprises transmitting, to the wireless device 811, a value of a parameter used to determine the evaluation period 821 (block 1411). In some embodiments, the method 1400 further comprises configuring at least one timer or counter of the wireless device 811 that is related to the evaluation period 821 (block 1413).

As shown in FIG. 26, the method 2600 comprises determining an evaluation period 821 that is common to at least a portion of reference signal resources in a set 823 of reference signal resources that are transmitted by the network node 801, with at least one of the reference signal resources in the set 823 being of a different type or configuration than another of the reference signal resources in the set 823 (block 2610). The method 2600 further comprises configuring the determined evaluation period 821 so that the wireless device 811 is operable to monitor channel quality of the portion of reference signal resources in the set 823 that are transmitted during the determined evaluation period 821 (block 2620).

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

In some embodiments, a non-limiting term "UE" is used. In one example, a UE may be any type of wireless device 811 capable of communicating with network node 801 or another UE over radio signals. The UE may also be a radio communication device, target device, device to device (D2D) UE, machine type UE or UE capable of machine to machine communication (M2M), a sensor equipped with UE, tablet computer, mobile terminals, smart phone, laptop embedded equipped (LEE), laptop mounted equipment (LME), USB dongles, Customer Premises Equipment (CPE) etc.

Also in some embodiments, a non-limiting term "network node" 801 is used. In one example, a network node 801 may be any kind of network node 801 which may comprise of a radio network node such as a base station, radio base station, base transceiver station, base station controller, network controller, multi-standard radio BS, gNB, en-gNB, ng-eNB, NR BS, evolved Node B (eNB), Node B, Multi-cell/multicast Coordination Entity (MCE), relay node, access point, radio access point, Remote Radio Unit (RRU) Remote Radio Head (RRH), a multi-standard BS (a.k.a. MSR BS), a core network node (e.g., MME, SON node, a coordinating node, positioning node, MDT node, etc.), or even an external node (e.g., $3^{rd}$ party node, a node external to the current network), etc. A network node 801 may also comprise a test equipment.

The term "BS" may comprise, e.g., gNB, en-gNB, ng-eNB or a relay node, or any BS compliant with the embodiments.

The term "radio node" may be used to denote a UE or a radio network node.

The term "signaling" may comprise any of: high-layer signaling (e.g., via RRC or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term RLM procedure may refer to any process occurs or action taken by the UE during the RLM. Examples of such processes or actions are OOS evaluation, IS evaluation, filtering of IS/OOS (e.g. start of counters), triggering of RLF, start or expiration of RLF timer etc.

The term RLM performance may refer to any criteria or metric which characterizes the performance of the RLM performed by a radio node. Examples of RLM performance criteria are evaluation period over which the IS/OOS are detected, time period within which the UE transmitter is to be turned off upon expiration of RLF timer etc.

The term numerology may comprise any one or a combination of: subcarrier spacing, number of subcarriers within a bandwidth, resource block size, symbol length, CP length, etc. In one specific non-limiting example, numerology comprises subcarrier spacing of 7.5 kHz, 15 kHz, 30 kHz, 60 kHz, 120 kHz, or 240 kHz. In another example, numerology is the CP length which may be used with subcarrier spacing 30 kHz or larger.

With respect to the time-frequency structure of an SS/PBCH block, in the time domain, an SS/PBCH block consists of 4 OFDM symbols, numbered in increasing order from 0 to 3. In the frequency domain, an SS/PBCH block consists of 24 contiguous resource blocks with the subcarriers numbered in increasing order from 0 to 287, starting with the resource block with the lowest number.

The UE may assume the sequence of symbols $d_{PSS}(0), \ldots, d_{PSS}(126)$ constituting the primary synchronization signal to be scaled by a factor $\beta_{SS}$ to conform to the PSS power allocation specified in 3GPP specification TS 38.213, and be mapped to resource elements $(k,l)_{p,\mu}$ in increasing order of k where k and l are given by Table 1 below, and represent the frequency and time indices, respectively, within one SS/PBCH block.

The UE may assume the sequence of symbols $d_{SSS}(0), \ldots, d_{SSS}(126)$ constituting the secondary synchronization signal to be scaled by a factor $\beta_{SS}$ to conform to the SSS power allocation specified in 3GPP specification TS 38.213 and mapped to resource elements $(k,l)_{p,\mu}$ in increasing order of k where k and l are given by Table 1 and represent the frequency and time indices, respectively, within one SS/PBCH block.

The UE may assume the sequence of complex-valued symbols $d_{PBCH}(0), \ldots, d_{PBCH}(M_{symb}-1)$ constituting the physical broadcast channel to be scaled by a factor $\beta_{PBCH}$ to conform to the PBCH power allocation specified in 3GPP specification TS 38.213 and mapped in sequence starting with $d_{PBCH}(0)$ to resource elements $(k,l)_{p,\mu}$ which are not used for PBCH demodulation reference signals.

The mapping to resource elements $(k,l)_{p,\mu}$ not reserved for other purposes may be in increasing order of first the index k and then the index l, where k and l represent the frequency and time indices, respectively, within one SS/PBCH block and are given by Table 1.

The UE may assume the sequence of complex-valued symbols $r_l(0), \ldots, r_l(71)$ constituting the demodulation reference signals for the physical broadcast channel in symbol l of the SS/PBCH block to be scaled by a factor of $\beta_{PBCH}$ to conform to the PBCH power allocation specified in 3GPP specification TS 38.213 and mapped to resource elements $(k,l)_{p,\mu}$ in increasing order of k where k and l are given by Table 1 and represent the frequency and time indices, respectively, within one SS/PBCH block.

For the SS/PBCH block, the UE may assume an antenna port p=4000, subcarrier spacing configuration $\mu \in \{0, 1, 3, 4\}$, and the same cyclic prefix length and subcarrier spacing for the PSS, SSS, and PBCH.

TABLE 1

Resources within an SS/PBCH block for PSS, SSS, PBCH, and DM-RS for PBCH

| Channel or signal | OFDM symbol number $l$ | Subcarrier number $k$ |
|---|---|---|
| PSS | 0 | 80, 81, . . . , 206 |
| SSS | 2 | 80, 81, . . . , 206 |
| PBCH | 1, 3 | 0, 1, . . . , 287 |
| DM-RS for PBCH | 1, 3 | 2, 6, 10, 14, 18, . . . , 282, 286 |

With respect to the time location of an SS/PBCH block, the locations in the time domain where a UE may monitor for a possible SS/PBCH block may be described in clause 4.1 of 3GPP standard TS 38.213.

A control-resource set (CORESET) may consist of $N_{RB}^{CORESET}$ resource blocks in the frequency domain and $N_{symb}^{CORESET} \in \{1, 2, 3\}$ symbols in the time domain where $N_{symb}^{CORESET}=3$ is supported for $N_{RB,DL}^{max, \mu} \leq X$ only.

A control-channel element may consist of 6 resource-element groups (REGs) where a resource-element group equals one resource block. Resource-element groups within a control-resource set may be numbered in increasing order in a time-first manner, starting with 0 for the first OFDM symbol and the lowest-numbered resource block in the control resource set.

A UE may be configured with multiple control-resource sets. Each control-resource set may be associated with one Channel Control Element (CCE)-to-Resource Element Group (REG) mapping only, according to particular embodiments.

The CCE-to-REG mapping for a control-resource set may be interleaved or non-interleaved, according to various embodiments. In some embodiments, the CCE-to-REG mapping may be described by certain REG bundles. For example, REG bundle i may be defined as REGs $\{i, i+1, \ldots, i+L-1\}$ where L is the REG bundle size. CCE j may consist of REG bundles $\{f(j), f(j+1), \ldots, f(j+6/L-1)\}$ where $f(\cdot)$ is an interleaver.

In one example of non-interleaved CCE-to-REG mapping, L=6 and f(i)=i.

In one example of interleaved CCE-to-REG mapping, $L \in \{2, 6\}$ for $N_{symb}^{CORESET}=1$ and $L \in \{N_{symb}^{CORESET}, 6\}$ for $N_{symb}^{CORESET} \in \{2, 3\}$.

The UE may assume the same precoding being used across a REG bundle, in particular embodiments.

Particular embodiments include methods for a UE and methods for a network node 801 (e.g., a serving BS which may be LTE PCell, NR PCell, and/or NR PSCell).

In one embodiment, when a UE is configured with multiple RLM-RS resources, a common evaluation period is determined for a subset or for all configured RLM-RS resources. In a further embodiment, the common evaluation period may comprise the same length of the evaluation period for the subset or for all configured RLM-RS resources, but not necessarily the same beginning of the evaluation period. In another embodiment, the common evaluation period may comprise the same length and the same beginning of the evaluation period for the subset or for all configured RLM-RS resources. Examples of the evaluation period are in-sync evaluation period and out-of-sync evaluation period. The evaluation period for in-sync and out-of-sync may or may not be the same, even for the same RLM-RS resource. The common evaluation period may be a fixed (e.g., pre-defined) value (at least for non-DRX and no gaps) or determined based on a function.

In one example, one or more evaluation periods are determined by a network node 801 which then configures the UE with the determined evaluation periods. In a further example, a network node 801 may indicate that a common evaluation period is to be used and may even configure a specific value (e.g., the total time in ms) which may be obtained based on a function F( ) described below.

In another example, UE determines (e.g., based on a pre-defined rule or function F( ) and/or message received from a network node 801) one or more evaluation periods and uses them while assessing the radio link quality during RLM.

In a further example, the common evaluation period is a default evaluation period, unless configured differently by a network node 801.

In a further embodiment, those configured RLM-RSs, which are comprising SS/PBCH blocks or associated with SS/PBCH blocks, are further comprised in the set of resources comprising or associated with the actually transmitted SS/PBCH blocks (e.g., indicated to the UE via RRC) and do not comprise any resources comprising or associated with SS/PBCH blocks that are not comprised in the set of actually transmitted SS/PBCH blocks.

The common evaluation period that applies for RLM-RSs may be characterized by one or more of:

Any two or more RLM-RS resources configured for the for a serving cell

Having the same RLM-RS resource type (e.g. SS/PBCH block or CSI-RS), but can be different for different RLM-RS resource types Having the same numerology (e.g., subcarrier spacing and/or CP length) associated with the RLM-RS resources and/or corresponding hypothetical control channel configuration Configured for the same frequency range (e.g., in FR1 or FR2 the common evaluation periods can be different but would be the same within the same frequency range)

Whether the RLM-RS resources are to be used for periodic or aperiodic RLM, e.g., the common evaluation period applies for periodic RLM but aperiodic, or the common evaluation period applies for aperiodic RLM but not periodic, or a common evaluation period applies for each of the periodic and aperiodic RLM but the common evaluation periods can be different for the two types of RLM RLM-RS resources are associated with the same cell (e.g., different cell or cell types such as NR PCell and NR PSCell can have different common evaluation period)

Whether RLM-RS resources comprised in a set of RLM-RS resources for which the network node 801 indicated that a common evaluation period applies (for other configured RLM-RS resources which are not comprised in this set a different evaluation period can apply)

RLM-RS resources associated with the same carrier frequency (e.g., comprising reference signals having the same center frequency and/or the same bandwidth)

Any two RLM-RS resources to be used for radio link quality evaluation based on the same hypothetical control channel (e.g., PDCCH) configuration, wherein the hypothetical control channel configuration can be pre-defined in the standard and/or configured by a network node 801 and may or may not have the same configuration as the actual control channel (actually the actual control channel may even not be transmitted in the resources where the hypothetical control channel quality is evaluated)

Any two RLM-RS resources to be used for radio link quality evaluation based on a hypothetical control channel (e.g., PDCCH) configuration associated with the same CORESET type (CORESET can be as specified in 38.211); examples of CORESET types: system information or OSI CORESET, CORESET for random access or for RAR, CORESET for paging, RMSI CORESET, etc.

Any two RLM-RS resources which can be evaluated in the same measurement gaps or based on the same measurement gap pattern According to particular embodiments of the present disclosure, a UE implementing the embodiments described herein may perform the following steps:

Step 1: Determine two or more RLM-RS resources for which a common RLM evaluation period applies.

Step 2: Determine the common evaluation period.

Step 3: Perform RLM based on the determined evaluation period.

In some embodiments, the UE may additionally perform a further step as follows:

Step 4: Determine the RLM (e.g., in-sync or out-of-sync) indication occasions or RLM indication interval, based on the common evaluation period; e.g., the indication occasion can be in the end of the evaluation period and hence dependent on the evaluation period configuration; the indication periodicity or interval can be defined to be the same or not longer than the common evaluation period.

A network node 801 implementing the embodiments described herein may perform at least the following steps:

Step 1 (optional in some embodiments): Determine two or more RLM-RS resources for which a common RLM evaluation period applies for a UE.

Step 2: Determine the common evaluation period.

Step 3: Configure the common evaluation period (e.g., for the determined two or more RLM-RS resources if Step 1 was used, otherwise for all configured RLM-RS resources).

Step 4 (optional in some embodiments): Configure at least one RLM/RLF related timer or counter (e.g., like T310, T311, T313 or N310) for the UE, while accounting for the common evaluation period (e.g., the timer may depend on whether the common evaluation period is used at all or may depend on its length).

For the two or more RLM-RS resources for which the common RLM evaluation period applies, the common evaluation period may be determined based on one or more principles described by the examples below. For example, the evaluation period may be determined as a function:

F(T1, ..., TN, BW1, ..., BWN, D1, ..., DN, FR, N1, ..., NN, tmin, drxConf, gapConf, Tsmtc) of at least one configuration parameter type (e.g., periodicity T, bandwidth BW, density D, frequency range FR in which the RLM-RSs are configured, number of samples of RLM-RS occasions comprising RLM-RS signals, shortest possible evaluation period tmin, DRX configuration such as DRX cycle length, gapConfiguration such as measurement gap periodicity and/or measurement gap length, Tsmtc SMTC period where SMTC is SS block (a.k.a. SS/PBCH block) based RRM measurement timing configuration comprising a periodically occurring window for RRM measurements) for the N RLM-RS resources. For example, F( )=F(max(T1, ..., TN)) is a function of the longest periodicity;

F( )=F(max(T1, ..., TN), max(BW1, ..., BWN)) is a function of the longest periodicity and largest bandwidth;

F( )=max(f(T1, BW1, D1, FR, N1, tmin), ..., f(TN, BWN, DN, FR, NN, tmin)) or mathematically equivalently F( )=max(tmin, max(f(T1, BW1, D1, FR, N1), ..., f(TN,BWN,DN,FR,NN))) is the longest evaluation period among those calculated for individual RLM-RS resources based on function F( ) with the parameters corresponding to the corresponding individual RLM-RS resource; or F( )=max(tmin, N*Tsmtc) where N is a number of samples for the DL quality measurement, Tsmtc is e.g. 20 ms, and tmin is e.g. 200 ms for OOS and 100 ms for IS.

The evaluation period typically increases with DRX cycle length. In one or more embodiments, the evaluation period increases with the measurement gap periodicity, at least for a fixed measurement gap length.

The evaluation period may then be used by the UE to acquire samples for each RLM-RS resources to perform the corresponding DL signal quality measurement (e.g., SINR). Based on the hypothetical control channel (e.g., PDCCH and DMRS) configuration and based on the DL measurements, the UE assesses the quality of the corresponding radio links (since the results of the DL measurements can be different for different RLM-RS resources, the result of the link quality assessment can be different for different RLM-RS resources). In one example, this may comprise mapping of the DL measurements to the quality (e.g., mapping SINR to BLER) of the hypothetical channel. The result of the mapping is then further compared to a threshold corresponding to a target performance metric (e.g., BLER of 2% or 10% for in-sync and out-of-sync, respectively). The UE physical layer then determines whether to indicate in-sync or out-of-sync to higher layers. In another example, this may comprise mapping of the target performance metric (e.g., BLER of 2% or 10% for in-sync and out-of-sync, respectively) to the corresponding DL signal quality measurement or DL signal quality thresholds (e.g., Q_in and Q_out thresholds). The UE then compares the result of the actual DL signal quality measurements to the DL signal quality thresholds. Based on the comparison, the UE physical layer then determines whether to indicate in-sync or out-of-sync to higher layers.

IS (in-sync) may be indicated if the estimated link quality corresponding to hypothetical PDCCH BLER based on at least Y=1 RLM-RS resource among all configured X RLM-RS resource(s) is above Q_in threshold, and OOS (out-of-sync) is indicated if the estimated link quality corresponding to hypothetical PDCCH BLER based on all configured X RLM-RS resource(s) is below Q_out threshold.

Figure 15:
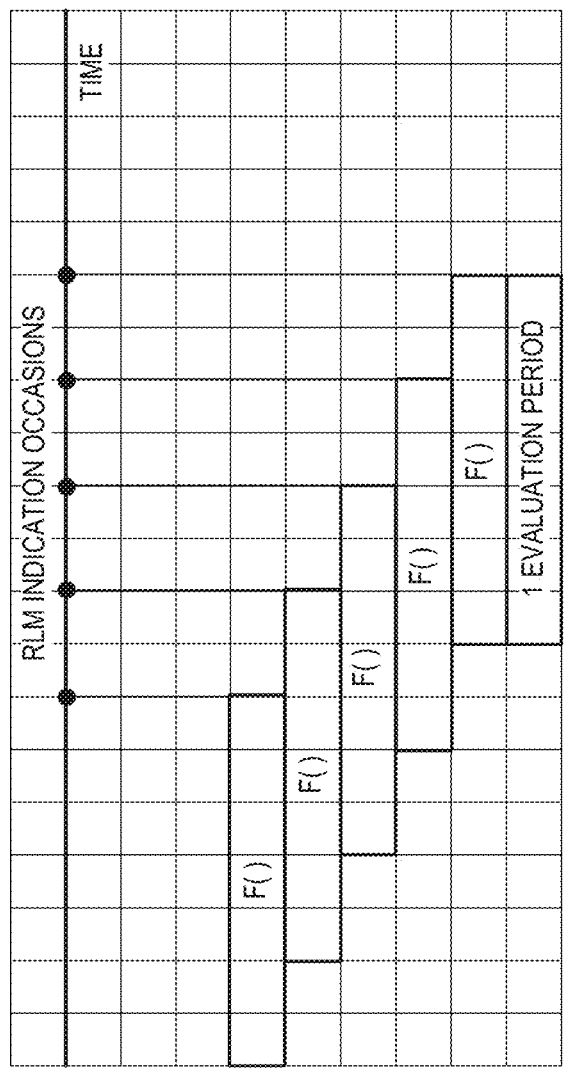
FIG. 15 is a schematic diagram illustrating an example of RLM with a sliding window evaluation period, according to one or more embodiments of the present disclosure.

FIG. 15 illustrates an example of RLM having an evaluation period implemented in a sliding window manner (e.g., similar to computing a running average), wherein each evaluation period is a common evaluation period for two or more RLM-RSs starting (and thus finishing) at the same time. Upon the evaluation period finishing, the UE may perform the mapping and comparison to corresponding thresholds to determine whether the physical layer needs to indicate to higher layers in-sync or out-of-sync.

Although the subject matter described herein may be implemented in any appropriate type of system using any suitable components, the embodiments disclosed herein are described in relation to a wireless network, such as the example wireless network illustrated in FIG. 16. For simplicity, the wireless network of FIG. 16 only depicts network 1606, network nodes 1660 and 1660b, and WDs 1610, 1610b, and 1610c. In practice, a wireless network may further include any additional elements suitable to support communication between wireless devices or between a wireless device and another communication device, such as a landline telephone, a service provider, or any other network node or end device. Of the illustrated components, network node 1660 and wireless device (WD) 1610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1660 and WD 1610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 16, network node 1660 includes processing circuitry 1670, device readable medium 1680, interface 1690, auxiliary equipment 1684, power source 1686, power circuitry 1687, and antenna 1662. Although network node 1660 illustrated in the example wireless network of FIG. 16 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1660 are depicted as single boxes located within a larger box, or nested within multiple boxes, in practice, a network node may comprise multiple different physical components that make up a single illustrated component (e.g., device readable medium 1680 may comprise multiple separate hard drives as well as multiple RAM modules).

Similarly, network node 1660 may be composed of multiple physically separate components (e.g., a NodeB component and a RNC component, or a BTS component and a BSC component, etc.), which may each have their own respective components. In certain scenarios in which network node 1660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1660 may be configured to support multiple radio access technologies (RATs). In such embodiments, some components may be duplicated (e.g., separate device readable medium 1680 for the different RATs) and some components may be reused (e.g., the same antenna 1662 may be shared by the RATs). Network node 1660 may also include multiple sets of the various illustrated components for different wireless technologies integrated into network node 1660, such as, for example, GSM, WCDMA, LTE, NR, WiFi, or Bluetooth wireless technologies. These wireless technologies may be integrated into the same or different chip or set of chips and other components within network node 1660.

Processing circuitry 1670 is configured to perform any determining, calculating, or similar operations (e.g., certain obtaining operations) described herein as being provided by a network node. These operations performed by processing circuitry 1670 may include processing information obtained by processing circuitry 1670 by, for example, converting the obtained information into other information, comparing the obtained information or converted information to information stored in the network node, and/or performing one or more operations based on the obtained information or converted information, and as a result of said processing making a determination.

Processing circuitry 1670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1660 components, such as device readable medium 1680, network node 1660 functionality. For example, processing circuitry 1670 may execute instructions stored in device readable medium 1680 or in memory within processing circuitry 1670. Such functionality may include providing any of the various wireless features, functions, or benefits discussed herein. In some embodiments, processing circuitry 1670 may include a system on a chip (SOC).

In some embodiments, processing circuitry 1670 may include one or more of radio frequency (RF) transceiver circuitry 1672 and baseband processing circuitry 1674. In some embodiments, radio frequency (RF) transceiver circuitry 1672 and baseband processing circuitry 1674 may be on separate chips (or sets of chips), boards, or units, such as radio units and digital units. In alternative embodiments, part or all of RF transceiver circuitry 1672 and baseband processing circuitry 1674 may be on the same chip or set of chips, boards, or units In certain embodiments, some or all of the functionality described herein as being provided by a network node, base station, eNB or other such network device may be performed by processing circuitry 1670 executing instructions stored on device readable medium 1680 or memory within processing circuitry 1670. In alternative embodiments, some or all of the functionality may be provided by processing circuitry 1670 without executing instructions stored on a separate or discrete device readable medium, such as in a hard-wired manner. In any of those embodiments, whether executing instructions stored on a device readable storage medium or not, processing circuitry 1670 can be configured to perform the described functionality. The benefits provided by such functionality are not limited to processing circuitry 1670 alone or to other components of network node 1660, but are enjoyed by network node 1660 as a whole, and/or by end users and the wireless network generally.

Device readable medium 1680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1670. Device readable medium 1680 may store any suitable instructions, data or information, including a computer program, software, an application including one or more of logic, rules, code, tables, etc. and/or other instructions capable of being executed by processing circuitry 1670 and, utilized by network node 1660. Device readable medium 1680 may be used to store any calculations made by processing circuitry 1670 and/or any data received via interface 1690. In some embodiments, processing circuitry 1670 and device readable medium 1680 may be considered to be integrated.

Interface 1690 is used in the wired or wireless communication of signalling and/or data between network node 1660, network 1606, and/or WDs 1610. As illustrated, interface 1690 comprises port(s)/terminal(s) 1694 to send and receive data, for example to and from network 1606 over a wired connection. Interface 1690 also includes radio front end circuitry 1692 that may be coupled to, or in certain embodiments a part of, antenna 1662. Radio front end circuitry 1692 comprises filters 1698 and amplifiers 1696. Radio front end circuitry 1692 may be connected to antenna 1662 and processing circuitry 1670. Radio front end circuitry may be configured to condition signals communicated between antenna 1662 and processing circuitry 1670. Radio front end circuitry 1692 may receive digital data that is to be sent out to other network nodes or WDs via a wireless connection. Radio front end circuitry 1692 may convert the digital data into a radio signal having the appropriate channel and bandwidth parameters using a combination of filters 1698 and/or amplifiers 1696. The radio signal may then be transmitted via antenna 1662. Similarly, when receiving data, antenna 1662 may collect radio signals which are then converted into digital data by radio front end circuitry 1692. The digital data may be passed to processing circuitry 1670. In other embodiments, the interface may comprise different components and/or different combinations of components.

In certain alternative embodiments, network node 1660 may not include separate radio front end circuitry 1692, instead, processing circuitry 1670 may comprise radio front end circuitry and may be connected to antenna 1662 without separate radio front end circuitry 1692. Similarly, in some embodiments, all or some of RF transceiver circuitry 1672 may be considered a part of interface 1690. In still other embodiments, interface 1690 may include one or more ports or terminals 1694, radio front end circuitry 1692, and RF transceiver circuitry 1672, as part of a radio unit (not shown), and interface 1690 may communicate with baseband processing circuitry 1674, which is part of a digital unit (not shown).

Antenna 1662 may include one or more antennas, or antenna arrays, configured to send and/or receive wireless signals. Antenna 1662 may be coupled to radio front end circuitry 1690 and may be any type of antenna capable of transmitting and receiving data and/or signals wirelessly. In some embodiments, antenna 1662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1662 may be separate from network node 1660 and may be connectable to network node 1660 through an interface or port.

Antenna 1662, interface 1690, and/or processing circuitry 1670 may be configured to perform any receiving operations and/or certain obtaining operations described herein as being performed by a network node. Any information, data and/or signals may be received from a wireless device, another network node and/or any other network equipment. Similarly, antenna 1662, interface 1690, and/or processing circuitry 1670 may be configured to perform any transmitting operations described herein as being performed by a network node. Any information, data and/or signals may be transmitted to a wireless device, another network node and/or any other network equipment.

Power circuitry 1687 may comprise, or be coupled to, power management circuitry and is configured to supply the components of network node 1660 with power for performing the functionality described herein. Power circuitry 1687 may receive power from power source 1686. Power source 1686 and/or power circuitry 1687 may be configured to provide power to the various components of network node 1660 in a form suitable for the respective components (e.g., at a voltage and current level needed for each respective component). Power source 1686 may either be included in, or external to, power circuitry 1687 and/or network node 1660. For example, network node 1660 may be connectable to an external power source (e.g., an electricity outlet) via an input circuitry or interface such as an electrical cable, whereby the external power source supplies power to power circuitry 1687. As a further example, power source 1686 may comprise a source of power in the form of a battery or battery pack which is connected to, or integrated in, power circuitry 1687. The battery may provide backup power should the external power source fail. Other types of power sources, such as photovoltaic devices, may also be used.

Alternative embodiments of network node 1660 may include additional components beyond those shown in FIG. 16 that may be responsible for providing certain aspects of the network node's functionality, including any of the functionality described herein and/or any functionality necessary to support the subject matter described herein. For example, network node 1660 may include user interface equipment to allow input of information into network node 1660 and to allow output of information from network node 1660. This may allow a user to perform diagnostic, maintenance, repair, and other administrative functions for network node 1660.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (Vol P) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1610 includes antenna 1611, interface 1614, processing circuitry 1620, device readable medium 1630, user interface equipment 1632, auxiliary equipment 1634, power source 1636 and power circuitry 1637. WD 1610 may include multiple sets of one or more of the illustrated components for different wireless technologies supported by WD 1610, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1610.

Antenna 1611 may include one or more antennas or antenna arrays, configured to send and/or receive wireless signals, and is connected to interface 1614. In certain alternative embodiments, antenna 1611 may be separate from WD 1610 and be connectable to WD 1610 through an interface or port. Antenna 1611, interface 1614, and/or processing circuitry 1620 may be configured to perform any receiving or transmitting operations described herein as being performed by a WD. Any information, data and/or signals may be received from a network node and/or another WD. In some embodiments, radio front end circuitry and/or antenna 1611 may be considered an interface.

As illustrated, interface 1614 comprises radio front end circuitry 1612 and antenna 1611. Radio front end circuitry 1612 comprise one or more filters 1618 and amplifiers 1616. Radio front end circuitry 1614 is connected to antenna 1611 and processing circuitry 1620, and is configured to condition signals communicated between antenna 1611 and processing circuitry 1620. Radio front end circuitry 1612 may be coupled to or a part of antenna 1611. In some embodiments, WD 1610 may not include separate radio front end circuitry 1612; rather, processing circuitry 1620 may comprise radio front end circuitry and may be connected to antenna 1611. Similarly, in some embodiments, some or all of RF transceiver circuitry 1622 may be considered a part of interface 1614. Radio front end circuitry 1612 may receive digital data that is to be sent out to other network nodes or WDs via a wireless connection. Radio front end circuitry 1612 may convert the digital data into a radio signal having the appropriate channel and bandwidth parameters using a combination of filters 1618 and/or amplifiers 1616. The radio signal may then be transmitted via antenna 1611. Similarly, when receiving data, antenna 1611 may collect radio signals which are then converted into digital data by radio front end circuitry 1612. The digital data may be passed to processing circuitry 1620. In other embodiments, the interface may comprise different components and/or different combinations of components.

Processing circuitry 1620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1610 components, such as device readable medium 1630, WD 1610 functionality. Such functionality may include providing any of the various wireless features or benefits discussed herein. For example, processing circuitry 1620 may execute instructions stored in device readable medium 1630 or in memory within processing circuitry 1620 to provide the functionality disclosed herein.

As illustrated, processing circuitry 1620 includes one or more of RF transceiver circuitry 1622, baseband processing circuitry 1624, and application processing circuitry 1626. In other embodiments, the processing circuitry may comprise different components and/or different combinations of components. In certain embodiments processing circuitry 1620 of WD 1610 may comprise a SOC. In some embodiments, RF transceiver circuitry 1622, baseband processing circuitry 1624, and application processing circuitry 1626 may be on separate chips or sets of chips. In alternative embodiments, part or all of baseband processing circuitry 1624 and application processing circuitry 1626 may be combined into one chip or set of chips, and RF transceiver circuitry 1622 may be on a separate chip or set of chips. In still alternative embodiments, part or all of RF transceiver circuitry 1622 and baseband processing circuitry 1624 may be on the same chip or set of chips, and application processing circuitry 1626 may be on a separate chip or set of chips. In yet other alternative embodiments, part or all of RF transceiver circuitry 1622, baseband processing circuitry 1624, and application processing circuitry 1626 may be combined in the same chip or set of chips. In some embodiments, RF transceiver circuitry 1622 may be a part of interface 1614. RF transceiver circuitry 1622 may condition RF signals for processing circuitry 1620.

In certain embodiments, some or all of the functionality described herein as being performed by a WD may be provided by processing circuitry 1620 executing instructions stored on device readable medium 1630, which in certain embodiments may be a computer-readable storage medium. In alternative embodiments, some or all of the functionality may be provided by processing circuitry 1620 without executing instructions stored on a separate or discrete device readable storage medium, such as in a hard-wired manner. In any of those particular embodiments, whether executing instructions stored on a device readable storage medium or not, processing circuitry 1620 can be configured to perform the described functionality. The benefits provided by such functionality are not limited to processing circuitry 1620 alone or to other components of WD 1610, but are enjoyed by WD 1610 as a whole, and/or by end users and the wireless network generally.

Processing circuitry 1620 may be configured to perform any determining, calculating, or similar operations (e.g., certain obtaining operations) described herein as being performed by a WD. These operations, as performed by processing circuitry 1620, may include processing information obtained by processing circuitry 1620 by, for example, converting the obtained information into other information, comparing the obtained information or converted information to information stored by WD 1610, and/or performing one or more operations based on the obtained information or converted information, and as a result of said processing making a determination.

Device readable medium 1630 may be operable to store a computer program, software, an application including one or more of logic, rules, code, tables, etc. and/or other instructions capable of being executed by processing circuitry 1620. Device readable medium 1630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1620. In some embodiments, processing circuitry 1620 and device readable medium 1630 may be considered to be integrated.

User interface equipment 1632 may provide components that allow for a human user to interact with WD 1610. Such interaction may be of many forms, such as visual, audial, tactile, etc. User interface equipment 1632 may be operable to produce output to the user and to allow the user to provide input to WD 1610. The type of interaction may vary depending on the type of user interface equipment 1632 installed in WD 1610. For example, if WD 1610 is a smart phone, the interaction may be via a touch screen; if WD 1610 is a smart meter, the interaction may be through a screen that provides usage (e.g., the number of gallons used) or a speaker that provides an audible alert (e.g., if smoke is detected). User interface equipment 1632 may include input interfaces, devices and circuits, and output interfaces, devices and circuits. User interface equipment 1632 is configured to allow input of information into WD 1610, and is connected to processing circuitry 1620 to allow processing circuitry 1620 to process the input information. User interface equipment 1632 may include, for example, a microphone, a proximity or other sensor, keys/buttons, a touch display, one or more cameras, a USB port, or other input circuitry. User interface equipment 1632 is also configured to allow output of information from WD 1610, and to allow processing circuitry 1620 to output information from WD 1610. User interface equipment 1632 may include, for example, a speaker, a display, vibrating circuitry, a USB port, a headphone interface, or other output circuitry. Using one or more input and output interfaces, devices, and circuits, of user interface equipment 1632, WD 1610 may communicate with end users and/or the wireless network, and allow them to benefit from the functionality described herein.

Auxiliary equipment 1634 is operable to provide more specific functionality which may not be generally performed by WDs. This may comprise specialized sensors for doing measurements for various purposes, interfaces for additional types of communication such as wired communications etc. The inclusion and type of components of auxiliary equipment 1634 may vary depending on the embodiment and/or scenario.

Power source 1636 may, in some embodiments, be in the form of a battery or battery pack. Other types of power sources, such as an external power source (e.g., an electricity outlet), photovoltaic devices or power cells, may also be used. WD 1610 may further comprise power circuitry 1637 for delivering power from power source 1636 to the various parts of WD 1610 which need power from power source 1636 to carry out any functionality described or indicated herein. Power circuitry 1637 may in certain embodiments comprise power management circuitry. Power circuitry 1637 may additionally or alternatively be operable to receive power from an external power source; in which case WD 1610 may be connectable to the external power source (such as an electricity Power circuitry 1637 may also in certain embodiments be operable to deliver power from an external power source to power source 1636. This may be, for example, for the charging of power source 1636. Power circuitry 1637 may perform any formatting, converting, or other modification to the power from power source 1636 to make the power suitable for the respective components of WD 1610 to which power is supplied.

Figure 17:
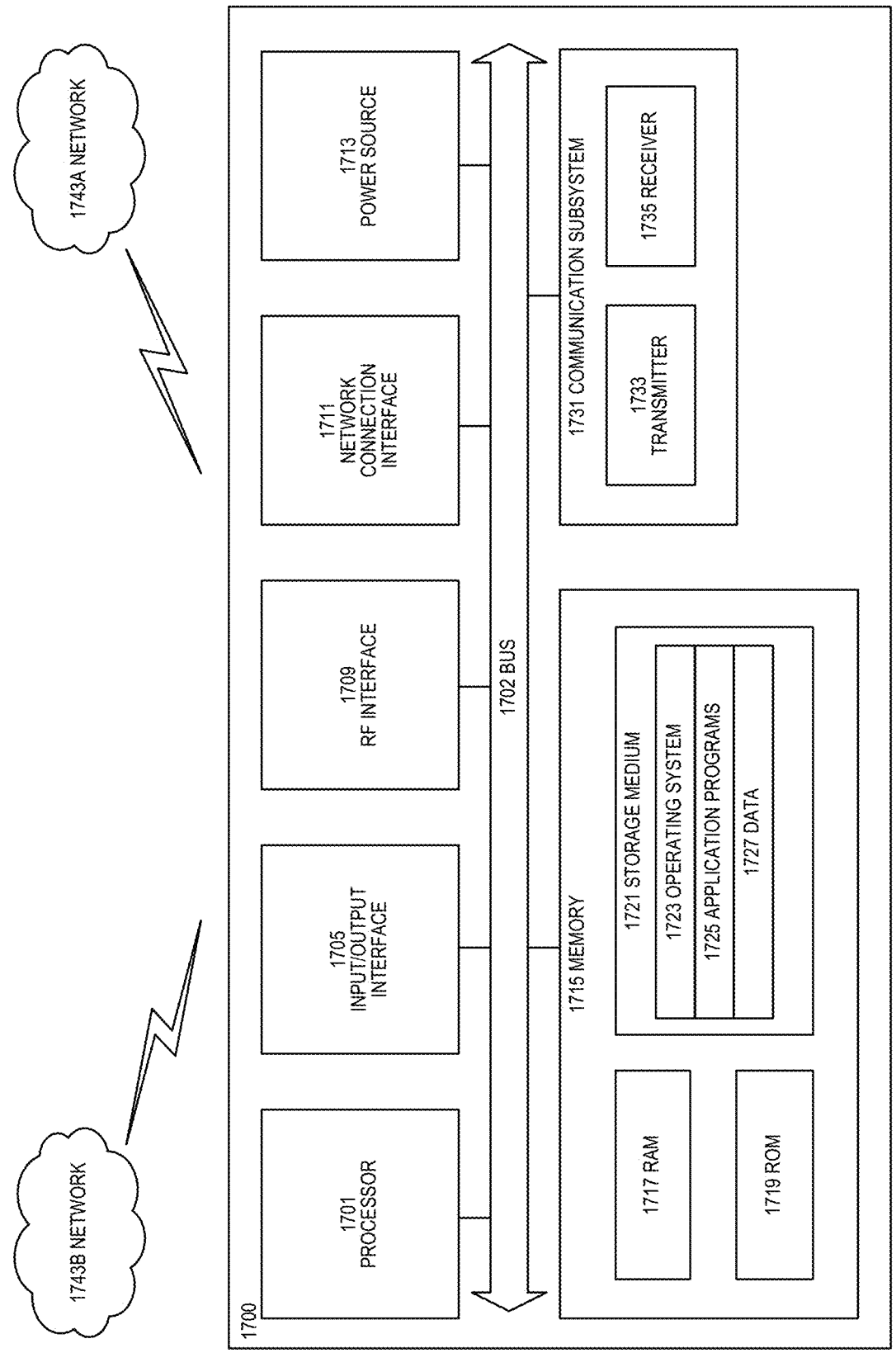
FIG. 17 is a schematic block diagram illustrating an example of a user equipment, according to particular embodiments of the present disclosure.

FIG. 17 illustrates one embodiment of a UE in accordance with various aspects described herein. As used herein, a outlet) via input circuitry or an interface such as an electrical power cable.

user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1720 may be any UE identified by the $3^{rd}$ Generation Partnership Project (3GPP), including a NB-IoT UE, a machine type communication (MTC) UE, and/or an enhanced MTC (eMTC) UE. UE 1700, as illustrated in FIG. 17, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 17 is a UE, the components discussed herein are equally applicable to a WD, and vice-versa.

In FIG. 17, UE 1700 includes processing circuitry 1701 that is operatively coupled to input/output interface 1705, radio frequency (RF) interface 1709, network connection interface 1711, memory 1715 including random access memory (RAM) 1717, read-only memory (ROM) 1719, and storage medium 1721 or the like, communication subsystem 1731, power source 1733, and/or any other component, or any combination thereof. Storage medium 1721 includes operating system 1723, application program 1725, and data 1727. In other embodiments, storage medium 1721 may include other similar types of information. Certain UEs may utilize all of the components shown in FIG. 17, or only a subset of the components. The level of integration between the components may vary from one UE to another UE. Further, certain UEs may contain multiple instances of a component, such as multiple processors, memories, transceivers, transmitters, receivers, etc.

In FIG. 17, processing circuitry 1701 may be configured to process computer instructions and data. Processing circuitry 1701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1701 may include two central processing units (CPUs). Data may be information in a form suitable for use by a computer.

In the depicted embodiment, input/output interface 1705 may be configured to provide a communication interface to an input device, output device, or input and output device. UE 1700 may be configured to use an output device via input/output interface 1705. An output device may use the same type of interface port as an input device. For example, a USB port may be used to provide input to and output from UE 1700. The output device may be a speaker, a sound card, a video card, a display, a monitor, a printer, an actuator, an emitter, a smartcard, another output device, or any combination thereof. UE 1700 may be configured to use an input device via input/output interface 1705 to allow a user to capture information into UE 1700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 17, RF interface 1709 may be configured to provide a communication interface to RF components such as a transmitter, a receiver, and an antenna. Network connection interface 1711 may be configured to provide a communication interface to network 1743*a*. Network 1743*a* may encompass wired and/or wireless networks such as a local-area network (LAN), a wide-area network (WAN), a computer network, a wireless network, a telecommunications network, another like network or any combination thereof. For example, network 1743*a* may comprise a Wi-Fi network. Network connection interface 1711 may be configured to include a receiver and a transmitter interface used to communicate with one or more other devices over a communication network according to one or more communication protocols, such as Ethernet, TCP/IP, SONET, ATM, or the like. Network connection interface 1711 may implement receiver and transmitter functionality appropriate to the communication network links (e.g., optical, electrical, and the like). The transmitter and receiver functions may share circuit components, software or firmware, or alternatively may be implemented separately.

RAM 1717 may be configured to interface via bus 1702 to processing circuitry 1701 to provide storage or caching of data or computer instructions during the execution of software programs such as the operating system, application programs, and device drivers. ROM 1719 may be configured to provide computer instructions or data to processing circuitry 1701. For example, ROM 1719 may be configured to store invariant low-level system code or data for basic system functions such as basic input and output (I/O), startup, or reception of keystrokes from a keyboard that are stored in a non-volatile memory. Storage medium 1721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1721 may be configured to include operating system 1723, application program 1725 such as a web browser application, a widget or gadget engine or another application, and data file 1727. Storage medium 1721 may store, for use by UE 1700, any of a variety of various operating systems or combinations of operating systems.

Storage medium 1721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1721 may allow UE 1700 to access computer-executable instructions, application programs or the like, stored on transitory or non-transitory memory media, to off-load data, or to upload data. An article of manufacture, such as one utilizing a communication system may be tangibly embodied in storage medium 1721, which may comprise a device readable medium.

In FIG. 17, processing circuitry 1701 may be configured to communicate with network 1743*b* using communication subsystem 1731. Network 1743*a* and network 1743*b* may be the same network or networks or different network or networks. Communication subsystem 1731 may be configured to include one or more transceivers used to communicate with network 1743*b*. For example, communication subsystem 1731 may be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver may include transmitter 1733 and/or receiver 1735 to implement transmitter or receiver functionality, respectively, appropriate to the RAN links (e.g., frequency allocations and the like). Further, transmitter 1733 and receiver 1735 of each transceiver may share circuit components, software or firmware, or alternatively may be implemented separately.

In the illustrated embodiment, the communication functions of communication subsystem 1731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1731 may include cellular communication, Wi-Fi communication, Bluetooth communication, and GPS communication. Network 1743*b* may encompass wired and/or wireless networks such as a local-area network (LAN), a wide-area network (WAN), a computer network, a wireless network, a telecommunications network, another like network or any combination thereof. For example, network 1743*b* may be a cellular network, a Wi-Fi network, and/or a near-field network. Power source 1713 may be configured to provide alternating current (AC) or direct current (DC) power to components of UE 1700.

The features, benefits and/or functions described herein may be implemented in one of the components of UE 1700 or partitioned across multiple components of UE 1700. Further, the features, benefits, and/or functions described herein may be implemented in any combination of hardware, software or firmware. In one example, communication subsystem 1731 may be configured to include any of the components described herein. Further, processing circuitry 1701 may be configured to communicate with any of such components over bus 1702. In another example, any of such components may be represented by program instructions stored in memory that when executed by processing circuitry 1701 perform the corresponding functions described herein. In another example, the functionality of any of such components may be partitioned between processing circuitry 1701 and communication subsystem 1731. In another example, the non-computationally intensive functions of any of such components may be implemented in software or firmware and the computationally intensive functions may be implemented in hardware.

Figure 18:
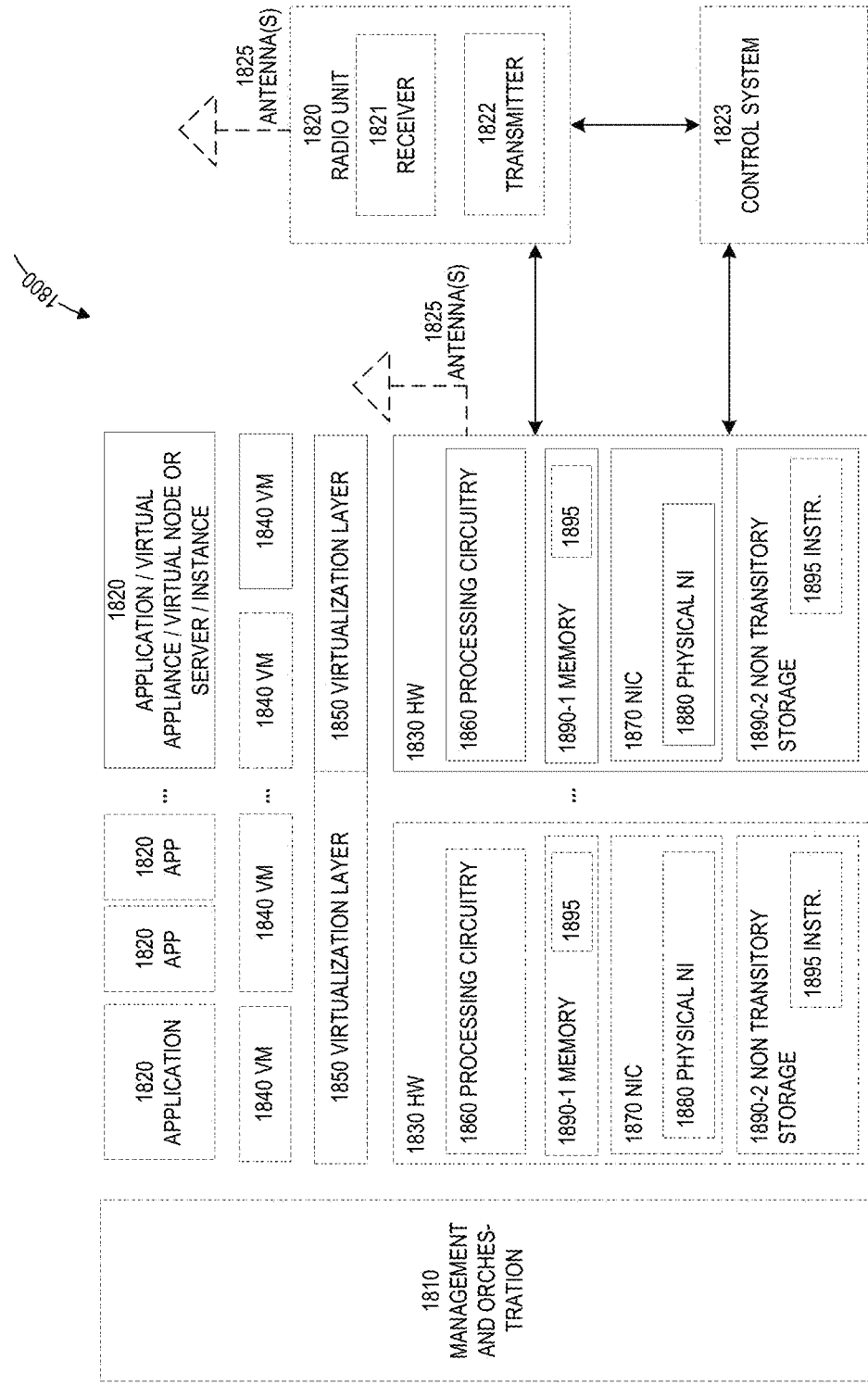
FIG. 18 is a schematic block diagram illustrating an example of a virtualization environment, according to particular embodiments of the present disclosure.

FIG. 18 is a schematic block diagram illustrating a virtualization environment 1800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1800 hosted by one or more of hardware nodes 1830. Further, in embodiments in which the virtual node is not a radio access node or does not require radio connectivity (e.g., a core network node), then the network node may be entirely virtualized.

The functions may be implemented by one or more applications 1820 (which may alternatively be called software instances, virtual appliances, network functions, virtual nodes, virtual network functions, etc.) operative to implement some of the features, functions, and/or benefits of some of the embodiments disclosed herein. Applications 1820 are run in virtualization environment 1800 which provides hardware 1830 comprising processing circuitry 1860 and memory 1890. Memory 1890 contains instructions 1895 executable by processing circuitry 1860 whereby application 1820 is operative to provide one or more of the features, benefits, and/or functions disclosed herein.

Virtualization environment 1800, comprises general-purpose or special-purpose network hardware devices 1830 comprising a set of one or more processors or processing circuitry 1860, which may be commercial off-the-shelf (COTS) processors, dedicated Application Specific Integrated Circuits (ASICs), or any other type of processing circuitry including digital or analog hardware components or special purpose processors. Each hardware device may comprise memory 1890-1 which may be non-persistent memory for temporarily storing instructions 1895 or software executed by processing circuitry 1860. Each hardware device may comprise one or more network interface controllers (NICs) 1870, also known as network interface cards, which include physical network interface 1880. Each hardware device may also include non-transitory, persistent, machine-readable storage media 1890-2 having stored therein software 1895 and/or instructions executable by processing circuitry 1860. Software 1895 may include any type of software including software for instantiating one or more virtualization layers 1850 (also referred to as hypervisors), software to execute virtual machines 1840 as well as software allowing it to execute functions, features and/or benefits described in relation with some embodiments described herein.

Virtual machines 1840, comprise virtual processing, virtual memory, virtual networking or interface and virtual storage, and may be run by a corresponding virtualization layer 1850 or hypervisor. Different embodiments of the instance of virtual appliance 1820 may be implemented on one or more of virtual machines 1840, and the implementations may be made in different ways.

During operation, processing circuitry 1860 executes software 1895 to instantiate the hypervisor or virtualization layer 1850, which may sometimes be referred to as a virtual machine monitor (VMM). Virtualization layer 1850 may present a virtual operating platform that appears like networking hardware to virtual machine 1840.

As shown in FIG. 18, hardware 1830 may be a standalone network node with generic or specific components. Hardware 1830 may comprise antenna 18225 and may implement some functions via virtualization. Alternatively, hardware 1830 may be part of a larger cluster of hardware (e.g. such as in a data center or customer premise equipment (CPE)) where many hardware nodes work together and are managed via management and orchestration (MANO) 1810, which, among others, oversees lifecycle management of applications 1820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1840 may be a software implementation of a physical machine that runs programs as if they were executing on a physical, non-virtualized machine. Each of virtual machines 1840, and that part of hardware 1830 that executes that virtual machine, be it hardware dedicated to that virtual machine and/or hardware shared by that virtual machine with others of the virtual machines 1840, forms a separate virtual network elements (VNE).

Still in the context of NFV, Virtual Network Function (VNF) is responsible for handling specific network functions that run in one or more virtual machines 1840 on top of hardware networking infrastructure 1830 and corresponds to application 1820 in FIG. 18.

In some embodiments, one or more radio units 1820 that each include one or more transmitters 1822 and one or more receivers 1821 may be coupled to one or more antennas 1825. Radio units 1820 may communicate directly with hardware nodes 1830 via one or more appropriate network interfaces and may be used in combination with the virtual components to provide a virtual node with radio capabilities, such as a radio access node or a base station.

In some embodiments, some signalling can be effected with the use of control system 1823 which may alternatively be used for communication between the hardware nodes 1830 and radio units 1820.

Figure 19:
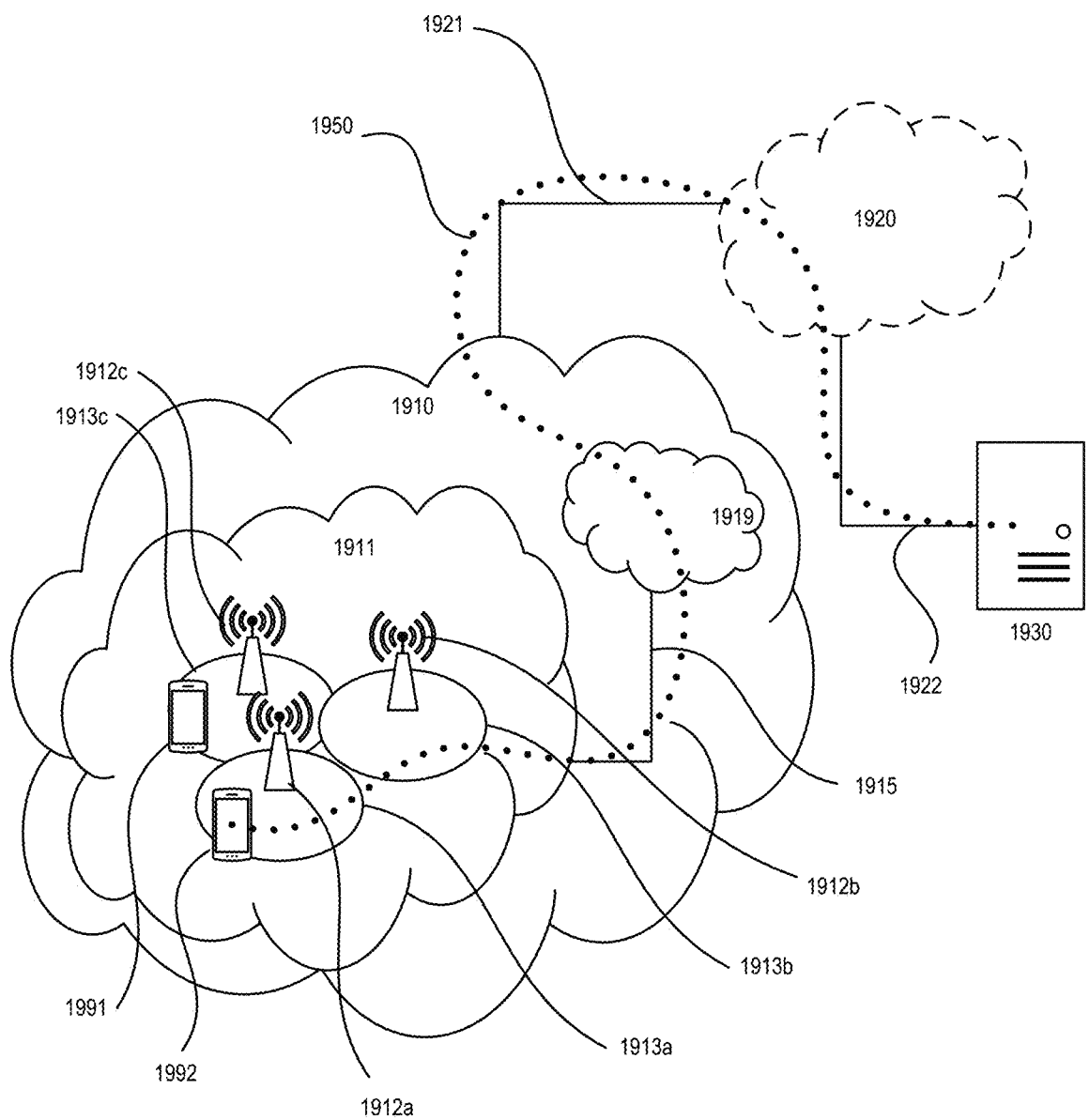
FIG. 19 is a schematic illustrating an example telecommunication network, according to particular embodiments of the present disclosure.

FIG. 19 illustrates a telecommunication network connected via an intermediate network to a host computer in accordance with some embodiments. In particular, with reference to FIG. 19, in accordance with an embodiment, a communication system includes telecommunication network 1910, such as a 3GPP-type cellular network, which comprises access network 1911, such as a radio access network, and core network 1914. Access network 1911 comprises a plurality of base stations 1912$a$, 1912$b$, 1912$c$, such as NBs, eNBs, gNBs or other types of wireless access points, each defining a corresponding coverage area 1913$a$, 1913$b$, 1913$c$. Each base station 1912$a$, 1912$b$, 1912$c$ is connectable to core network 1914 over a wired or wireless connection 1915. A first UE 1991 located in coverage area 1913$c$ is configured to wirelessly connect to, or be paged by, the corresponding base station 1912$c$. A second UE 1992 in coverage area 1913$a$ is wirelessly connectable to the corresponding base station 1912$a$. While a plurality of UEs 1991, 1992 are illustrated in this example, the disclosed embodiments are equally applicable to a situation where a sole UE is in the coverage area or where a sole UE is connecting to the corresponding base station 1912.

Telecommunication network 1910 is itself connected to host computer 1930, which may be embodied in the hardware and/or software of a standalone server, a cloud-implemented server, a distributed server or as processing resources in a server farm. Host computer 1930 may be under the ownership or control of a service provider, or may be operated by the service provider or on behalf of the service provider. Connections 1921 and 1922 between telecommunication network 1910 and host computer 1930 may extend directly from core network 1914 to host computer 1930 or may go via an optional intermediate network 1920. Intermediate network 1920 may be one of, or a combination of more than one of, a public, private or hosted network; intermediate network 1920, if any, may be a backbone network or the Internet; in particular, intermediate network 1920 may comprise two or more sub-networks (not shown).

The communication system of FIG. 19 as a whole enables connectivity between the connected UEs 1991, 1992 and host computer 1930. The connectivity may be described as an over-the-top (OTT) connection 1950. Host computer 1930 and the connected UEs 1991, 1992 are configured to communicate data and/or signaling via OTT connection 1950, using access network 1911, core network 1914, any intermediate network 1920 and possible further infrastructure (not shown) as intermediaries. OTT connection 1950 may be transparent in the sense that the participating communication devices through which OTT connection 1950 passes are unaware of routing of uplink and downlink communications. For example, base station 1912 may not or need not be informed about the past routing of an incoming downlink communication with data originating from host computer 1930 to be forwarded (e.g., handed over) to a connected UE 1991. Similarly, base station 1912 need not be aware of the future routing of an outgoing uplink communication originating from the UE 1991 towards the host computer 1930.

Figure 20:
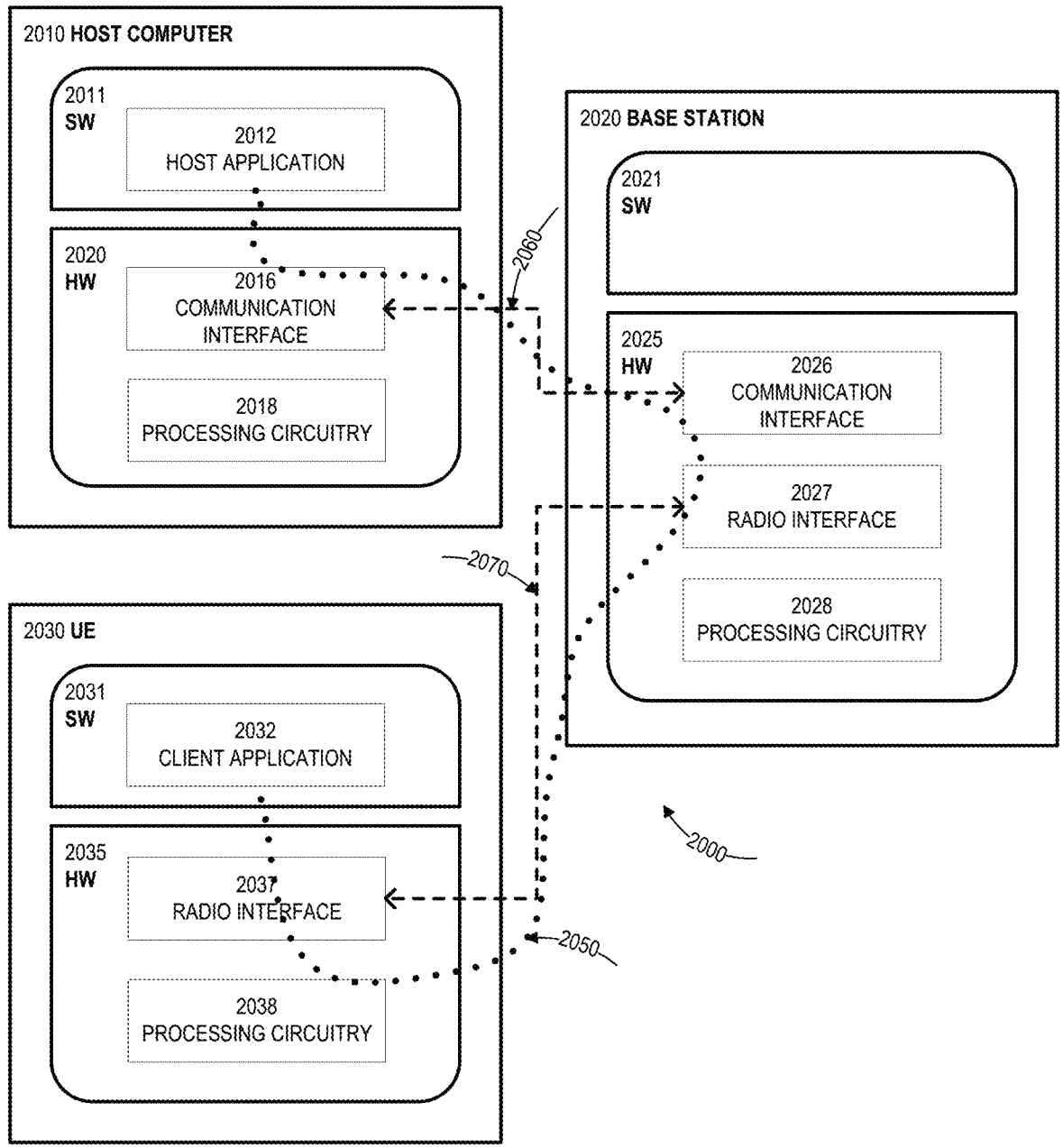
FIG. 20 is a schematic block diagram illustrating an example communication system, according to particular embodiments of the present disclosure.

Example implementations, in accordance with an embodiment, of the UE, base station and host computer discussed in the preceding paragraphs will now be described with reference to FIG. 20. FIG. 20 illustrates host computer communicating via a base station with a user equipment over a partially wireless connection in accordance with some embodiments In communication system 2000, host computer 2010 comprises hardware 2015 including communication interface 2016 configured to set up and maintain a wired or wireless connection with an interface of a different communication device of communication system 2000. Host computer 2010 further comprises processing circuitry 2018, which may have storage and/or processing capabilities. In particular, processing circuitry 2018 may comprise one or more programmable processors, application-specific integrated circuits, field programmable gate arrays or combinations of these (not shown) adapted to execute instructions. Host computer 2010 further comprises software 2011, which is stored in or accessible by host computer 2010 and executable by processing circuitry 2018. Software 2011 includes host application 2012. Host application 2012 may be operable to provide a service to a remote user, such as UE 2030 connecting via OTT connection 2050 terminating at UE 2030 and host computer 2010. In providing the service to the remote user, host application 2012 may provide user data which is transmitted using OTT connection 2050.

Communication system 2000 further includes base station 2020 provided in a telecommunication system and comprising hardware 2025 enabling it to communicate with host computer 2010 and with UE 2030. Hardware 2025 may include communication interface 2026 for setting up and maintaining a wired or wireless connection with an interface of a different communication device of communication system 2000, as well as radio interface 2027 for setting up and maintaining at least wireless connection 2070 with UE 2030 located in a coverage area (not shown in FIG. 20) served by base station 2020. Communication interface 2026 may be configured to facilitate connection 2060 to host computer 2010. Connection 2060 may be direct or it may pass through a core network (not shown in FIG. 20) of the telecommunication system and/or through one or more intermediate networks outside the telecommunication system. In the embodiment shown, hardware 2025 of base station 2020 further includes processing circuitry 2028, which may comprise one or more programmable processors, application-specific integrated circuits, field programmable gate arrays or combinations of these (not shown) adapted to execute instructions. Base station 2020 further has software 2021 stored internally or accessible via an external connection.

Communication system 2000 further includes UE 2030 already referred to. Its hardware 2035 may include radio interface 2037 configured to set up and maintain wireless connection 2070 with a base station serving a coverage area in which UE 2030 is currently located. Hardware 2035 of UE 2030 further includes processing circuitry 2038, which may comprise one or more programmable processors, application-specific integrated circuits, field programmable gate arrays or combinations of these (not shown) adapted to execute instructions. UE 2030 further comprises software 2031, which is stored in or accessible by UE 2030 and executable by processing circuitry 2038. Software 2031 includes client application 2032. Client application 2032 may be operable to provide a service to a human or non-human user via UE 2030, with the support of host computer 2010. In host computer 2010, an executing host application 2012 may communicate with the executing client application 2032 via OTT connection 2050 terminating at UE 2030 and host computer 2010. In providing the service to the user, client application 2032 may receive request data from host application 2012 and provide user data in response to the request data. OTT connection 2050 may transfer both the request data and the user data. Client application 2032 may interact with the user to generate the user data that it provides.

It is noted that host computer 2010, base station 2020 and UE 2030 illustrated in FIG. 20 may be similar or identical to host computer 2030, one of base stations 2012*a*, 2012*b*, 2012*c* and one of UEs 2091, 2092 of FIG. 20, respectively. This is to say, the inner workings of these entities may be as shown in FIG. 20 and independently, the surrounding network topology may be that of FIG. 20.

In FIG. 20, OTT connection 2050 has been drawn abstractly to illustrate the communication between host computer 2010 and UE 2030 via base station 2020, without explicit reference to any intermediary devices and the precise routing of messages via these devices. Network infrastructure may determine the routing, which it may be configured to hide from UE 2030 or from the service provider operating host computer 2010, or both. While OTT connection 2050 is active, the network infrastructure may further take decisions by which it dynamically changes the routing (e.g., on the basis of load balancing consideration or reconfiguration of the network).

Wireless connection 2070 between UE 2030 and base station 2020 is in accordance with the teachings of the embodiments described throughout this disclosure. One or more of the various embodiments improve the performance of OTT services provided to UE 2030 using OTT connection 2050, in which wireless connection 2070 forms the last segment.

A measurement procedure may be provided for the purpose of monitoring data rate, latency and other factors on which the one or more embodiments improve. There may further be an optional network functionality for reconfiguring OTT connection 2050 between host computer 2010 and UE 2030, in response to variations in the measurement results. The measurement procedure and/or the network functionality for reconfiguring OTT connection 2050 may be implemented in software 2011 and hardware 2015 of host computer 2010 or in software 2031 and hardware 2035 of UE 2030, or both. In embodiments, sensors (not shown) may be deployed in or in association with communication devices through which OTT connection 2050 passes; the sensors may participate in the measurement procedure by supplying values of the monitored quantities exemplified above, or supplying values of other physical quantities from which software 2011, 2031 may compute or estimate the monitored quantities. The reconfiguring of OTT connection 2050 may include message format, retransmission settings, preferred routing etc.; the reconfiguring need not affect base station 2020, and it may be unknown or imperceptible to base station 2020. Such procedures and functionalities may be known and practiced in the art. In certain embodiments, measurements may involve proprietary UE signaling facilitating host computer 2010's measurements of throughput, propagation times, latency and the like. The measurements may be implemented in that software 2011 and 2031 causes messages to be transmitted, in particular empty or 'dummy' messages, using OTT connection 2050 while it monitors propagation times, errors etc.

Figure 21:
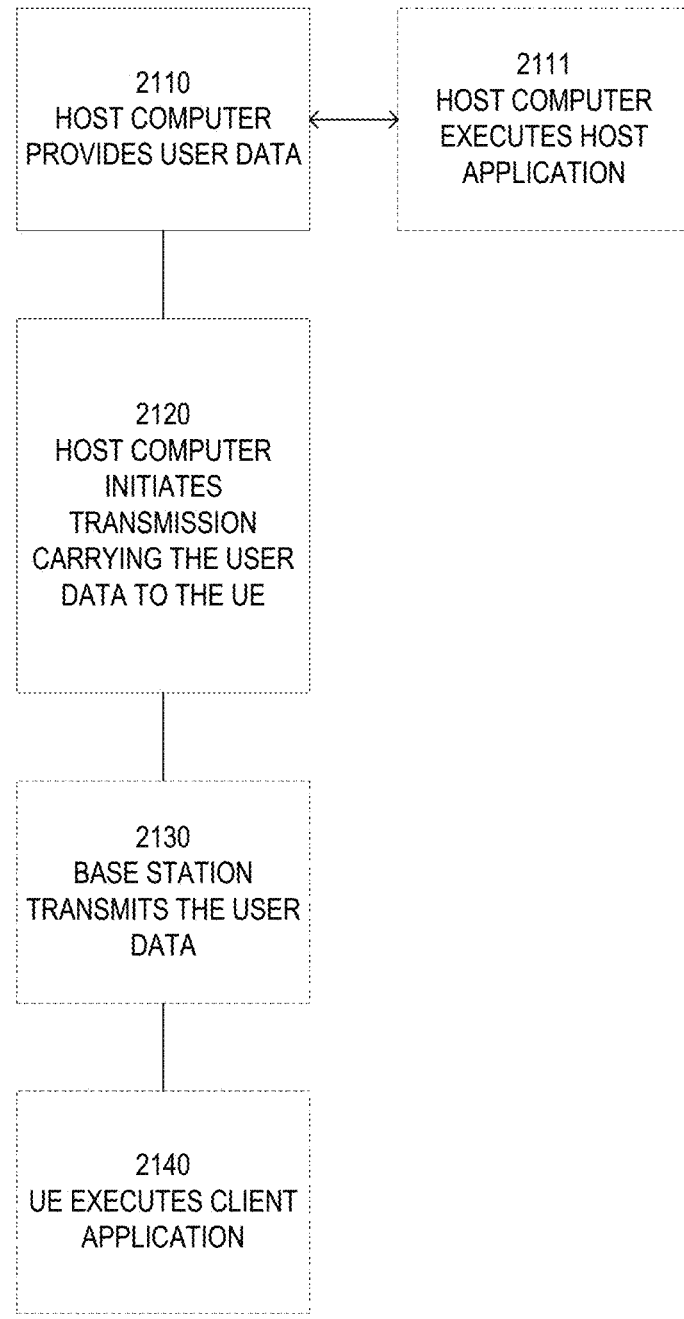
FIGS. 21-26 are flow diagrams, each of which illustrates an example method, according to particular embodiments of the present disclosure.

FIG. 21 is a flowchart illustrating a method implemented in a communication system, in accordance with one embodiment. The communication system includes a host computer, a base station and a UE which may be those described with reference to FIGS. 14 and 21. For simplicity of the present disclosure, only drawing references to FIG. 21 will be included in this section. In step 2110, the host computer provides user data. In substep 2111 (which may be optional) of step 2110, the host computer provides the user data by executing a host application. In step 2120, the host computer initiates a transmission carrying the user data to the UE. In step 2130 (which may be optional), the base station transmits to the UE the user data which was carried in the transmission that the host computer initiated, in accordance with the teachings of the embodiments described throughout this disclosure. In step 2140 (which may also be optional), the UE executes a client application associated with the host application executed by the host computer.

Figure 22:
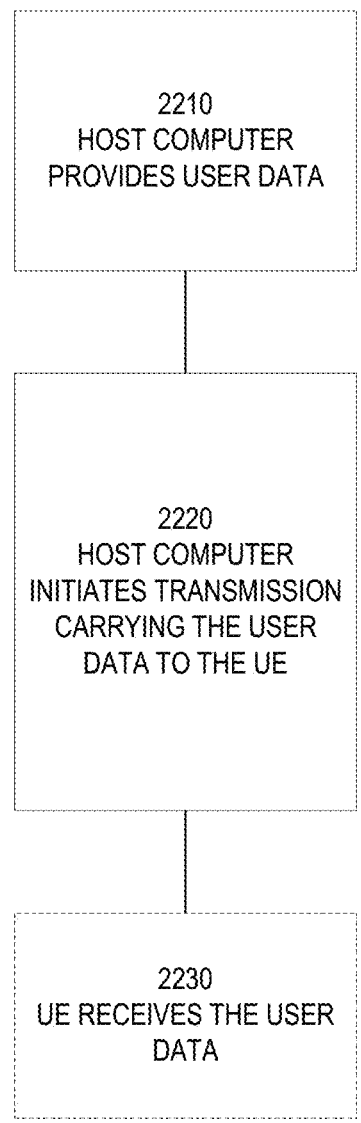

FIG. 22 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 22 will be included in this section. In step 2210 of the method, the host computer provides user data. In an optional substep (not shown) the host computer provides the user data by executing a host application. In step 2220, the host computer initiates a transmission carrying the user data to the UE. The transmission may pass via the base station, in accordance with the teachings of the embodiments described throughout this disclosure. In step 2230 (which may be optional), the UE receives the user data carried in the transmission.

Figure 23:
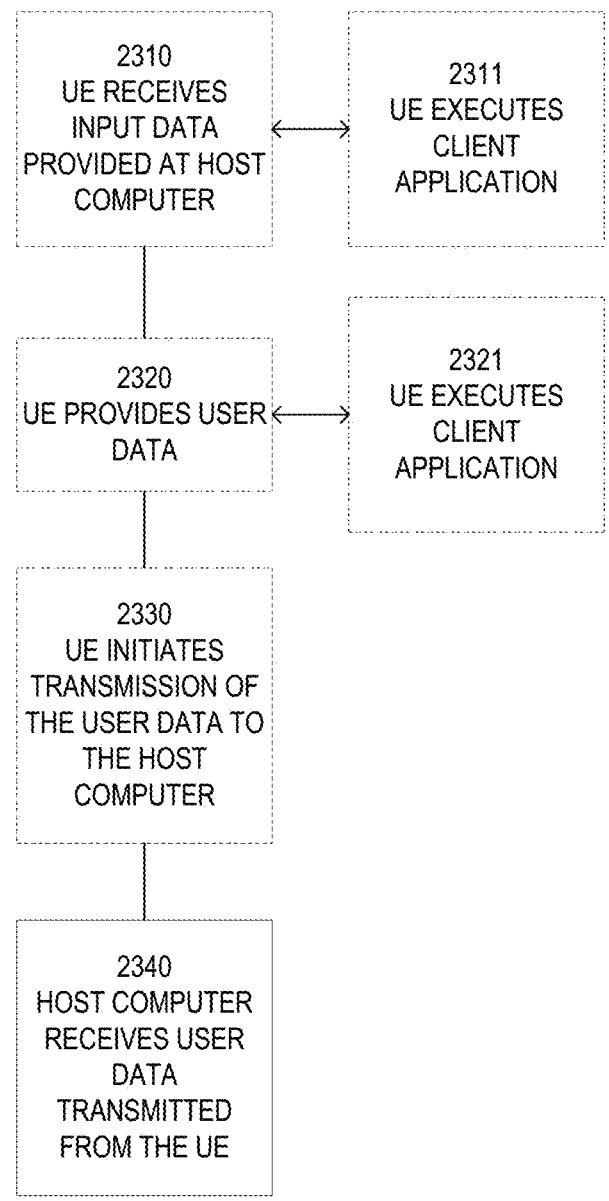

FIG. 23 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 23 will be included in this section. In step 2310 (which may be optional), the UE receives input data provided by the host computer. Additionally or alternatively, in step 2320, the UE provides user data. In substep 2321 (which may be optional) of step 2320, the UE provides the user data by executing a client application. In substep 2311 (which may be optional) of step 2310, the UE executes a client application which provides the user data in reaction to the received input data provided by the host computer. In providing the user data, the executed client application may further consider user input received from the user. Regardless of the specific manner in which the user data was provided, the UE initiates, in substep 2330 (which may be optional), transmission of the user data to the host computer. In step 2340 of the method, the host computer receives the user data transmitted from the UE, in accordance with the teachings of the embodiments described throughout this disclosure.

Figure 24:
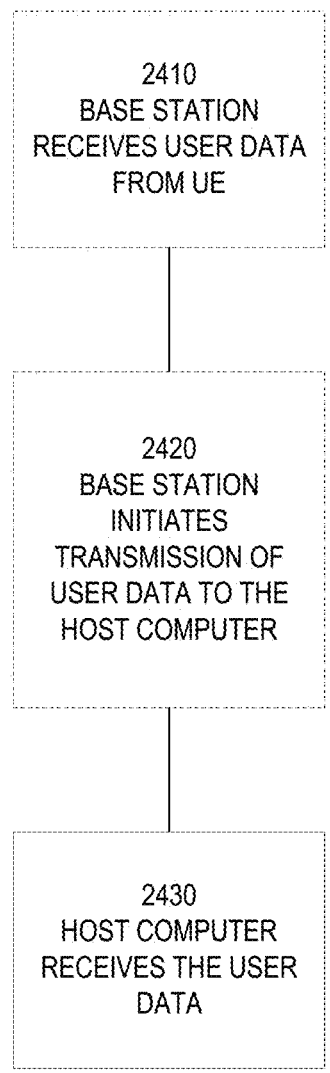

FIG. 24 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 24 will be included in this section. In step 2410 (which may be optional), in accordance with the teachings of the embodiments described throughout this disclosure, the base station receives user data from the UE. In step 2420 (which may be optional), the base station initiates transmission of the received user data to the host computer. In step 2430 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The invention claimed is:

1. A method performed by a wireless device for configuring a radio link monitoring evaluation period, comprising:
    determining an evaluation period that is common to at least a portion of reference signal resources in a set of reference signal resources that are transmitted by a network node,
    wherein the determined evaluation period has the same length for all of the reference signal resources in the at least a portion of reference signal resources, and
    wherein the portion of reference signal resources having the determined evaluation period includes two or more reference signal resources of the same type but being of a different periodicity than each other; and
    monitoring channel quality of the portion of reference signal resources in the set that are received during the determined evaluation period.

2. The method of claim 1, further comprising determining which of a plurality of resources configured by the network node as reference signal resources for monitoring of the channel quality are comprised in the set of reference signal resources that are transmitted by the network node.

3. The method of claim 2, wherein determining which of the plurality of resources configured by the network node as reference signal resources for monitoring of the channel quality are comprised in the set of reference signal resources that are transmitted by the network node is based on an indication from the network node indicating which of the plurality of resources configured as reference signal resources for monitoring of the channel quality are transmitted.

4. The method of claim 1, further comprising determining the portion of reference signal resources in the set that correspond to the evaluation period.

5. The method of claim 1, wherein the portion of reference signal resources in the set includes at least two reference signal resources.

6. The method of claim 1, further comprising determining whether the wireless device is in-sync or out-of-sync with the network node based on the channel quality of the portion of reference signal resources in the set that are received during the evaluation period.

7. The method of claim 6, wherein said determining whether the wireless device is in-sync or out-of-sync is responsive to said monitoring performed during the evaluation period.

8. The method of claim 6, wherein said determining whether the wireless device is in-sync or out-of-sync is performed at a certain interval, a length of the certain interval being no more than a length of the evaluation period.

9. The method of claim 1, wherein the set of reference signal resources is a subset of a plurality of radio link monitoring reference signal resources with which the wireless device is configured by the network node,
wherein the plurality of radio link monitoring reference signal resources with which the wireless device is configured includes at least some of a set of resources associated with SS/PBCH blocks but does not include any resources associated with SS/PBCH blocks that are not included in a set of actually transmitted SS/PBCH blocks.

10. The method of claim 1, wherein the evaluation period corresponds to a period for determining whether the wireless device is out-of-sync with the network node.

11. The method of claim 1, wherein a length of the evaluation period is predetermined.

12. The method of claim 1, wherein a length of the evaluation period is based on a function, wherein the function is based on at least one of the following parameters:
periodicity;
bandwidth;
density;
frequency range in which the set is configured;
number of samples of the set that comprise reference signals;
shortest possible evaluation period;
discontinuous receive (DRX) configuration;
gap configuration;
SMTC period.

13. The method of claim 1, further comprising receiving, by the wireless device, from the network node, the evaluation period.

14. The method of claim 13, wherein said determining the evaluation period is responsive to said receiving.

15. The method of claim 1, further comprising receiving, by the wireless device, from the network node, a value of a parameter used to determine the evaluation period, wherein said determining the evaluation period is based on the parameter, wherein the parameter is at least one of the following:
periodicity;
bandwidth;
density;
frequency range in which the set is configured;
number of samples of the set that comprise reference signals;
shortest possible evaluation period;
discontinuous receive (DRX) configuration;
gap configuration; and
SMTC period.

16. The method of claim 1, further comprising obtaining a value of a parameter for a function that is used to determine the evaluation period.

17. The method of claim 1, wherein the two or more resources of the same type are synchronization signal block (SSB) resources.

18. The method of claim 1, wherein the two or more resources of the same type are channel state information reference signal (CSI-RS) resources.

19. A method performed by a network node for configuring a radio link monitoring evaluation period for a wireless device, comprising:
determining an evaluation period that is common to at least a portion of reference signal resources in a set of reference signal resources that are transmitted by the network node,
wherein the determined evaluation period has the same length for all of the reference signal resources in the at least a portion of reference signal resources, and
wherein the portion of reference signal resources having the determined evaluation period includes two or more reference signal resources of the same type but being of a different periodicity than each other; and
configuring the determined evaluation period so that the wireless device is operable to monitor channel quality of the portion of reference signal resources in the set that are transmitted during the determined evaluation period.

20. The method of claim 19, further comprising sending an indication to the wireless device to indicate which of a plurality of resources configured as reference signal resources for monitoring of the channel quality are transmitted.

21. The method of claim 19, wherein the portion of reference signal resources in the set includes at least two reference signal resources.

22. The method of claim 19, wherein a length of the evaluation period is predetermined.

23. The method of claim 19, wherein a length of the evaluation period is based on a function, wherein the function is based on at least one of the following parameters:
periodicity;
bandwidth;
density;
frequency range in which the set is configured;
number of samples of the set that comprise reference signals;
shortest possible evaluation period;
discontinuous receive (DRX) configuration;
gap configuration; and
SMTC period.

24. The method of claim 19, further comprising transmitting, by the network node, to the wireless device, the evaluation period.

25. The method of claim 19, further comprising obtaining a value of a parameter for a function that is used to determine the evaluation period, wherein said determining the evaluation period is based on the parameter.

26. The method of claim 19, further comprising transmitting, by the network node, to the wireless device, a value of a parameter for a function that is used by the wireless device to determine the evaluation period, wherein the parameter is at least one of the following:
periodicity;
bandwidth;
density;
frequency range in which the set is configured;
number of samples of the set that comprise reference signals;
shortest possible evaluation period;
discontinuous receive (DRX) configuration;
gap configuration; and
SMTC period.

27. The method claim 19, further comprising configuring at least one timer or counter of the wireless device that is related to the evaluation period.

28. A wireless device comprising:
processing circuitry and memory, the memory containing instructions executable by the processing circuitry whereby the wireless device is configured to:
determine an evaluation period that is common to at least a portion of reference signal resources in a set of reference signal resources that are transmitted by a network node,
wherein the determined evaluation period has the same length for all of the reference signal resources in the at least a portion of reference signal resources, and
wherein the portion of reference signal resources having the determined evaluation period includes two or more reference signal resources of the same type but being of a different periodicity than each other; and
monitor channel quality of the portion of reference signal resources in the set that are received during the determined evaluation period.

29. A network node comprising:
processing circuitry and memory, the memory containing instructions executable by the processing circuitry whereby the network node is configured to:
determine an evaluation period that is common to at least a portion of reference signal resources in a set of reference signal resources that are transmitted by the network node,
wherein the determined evaluation period has the same length for all of the reference signal resources in the at least a portion of reference signal resources, and
wherein the portion of reference signal resources having the determined evaluation period includes two or more reference signal resources of the same type but being of a different periodicity than each other; and
configure the determined evaluation period so that a wireless device is operable to monitor channel quality of the portion of reference signal resources in the set that are transmitted during the determined evaluation period.

\* \* \* \* \*